July 3, 1951
H. C. MAY ET AL
2,558,866
GAS TURBINE PLANT
Original Filed April 20, 1948
3 Sheets-Sheet 1
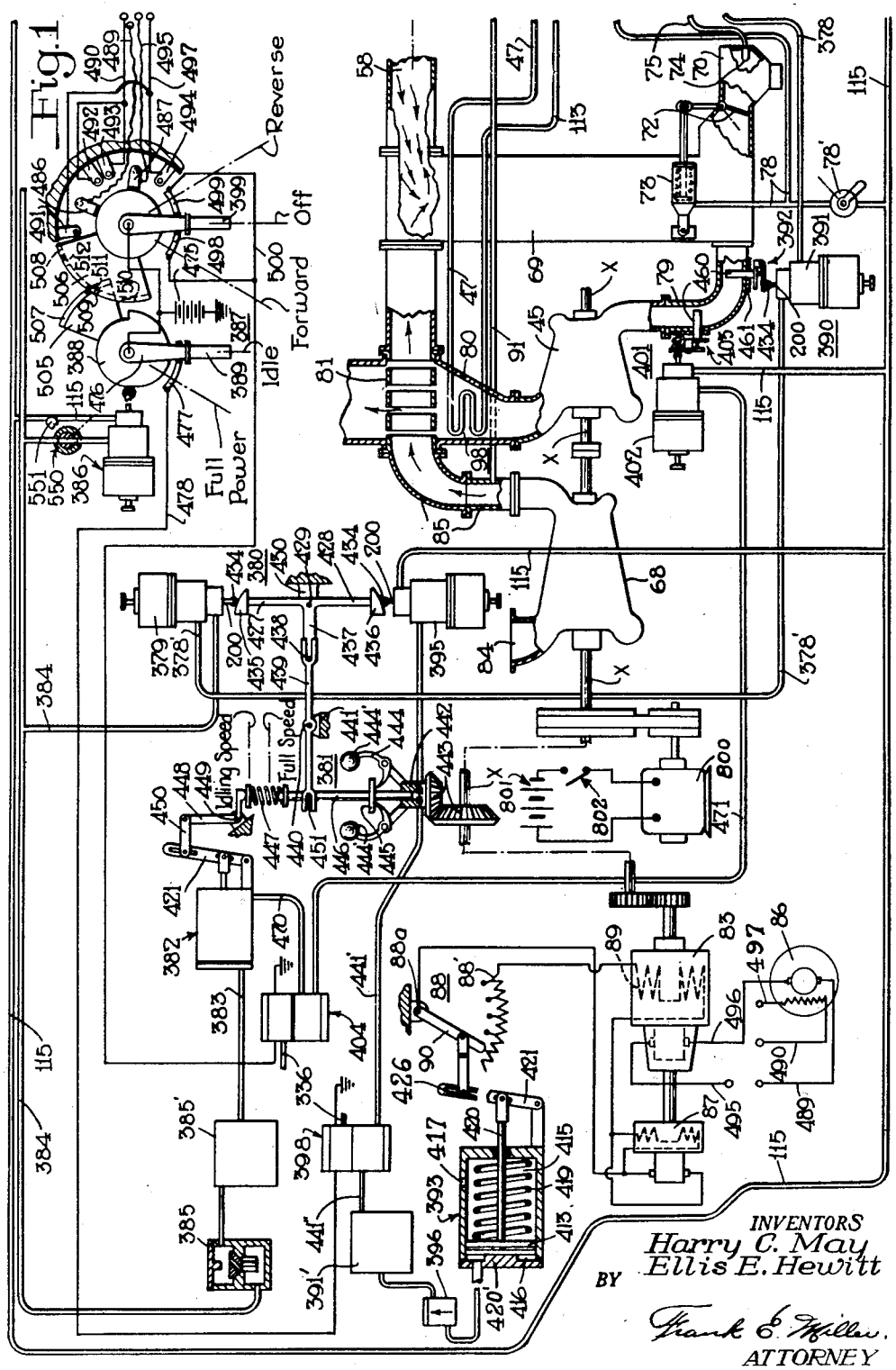
INVENTORS
Harry C. May
Ellis E. Hewitt
BY
Frank E. Miller
ATTORNEY

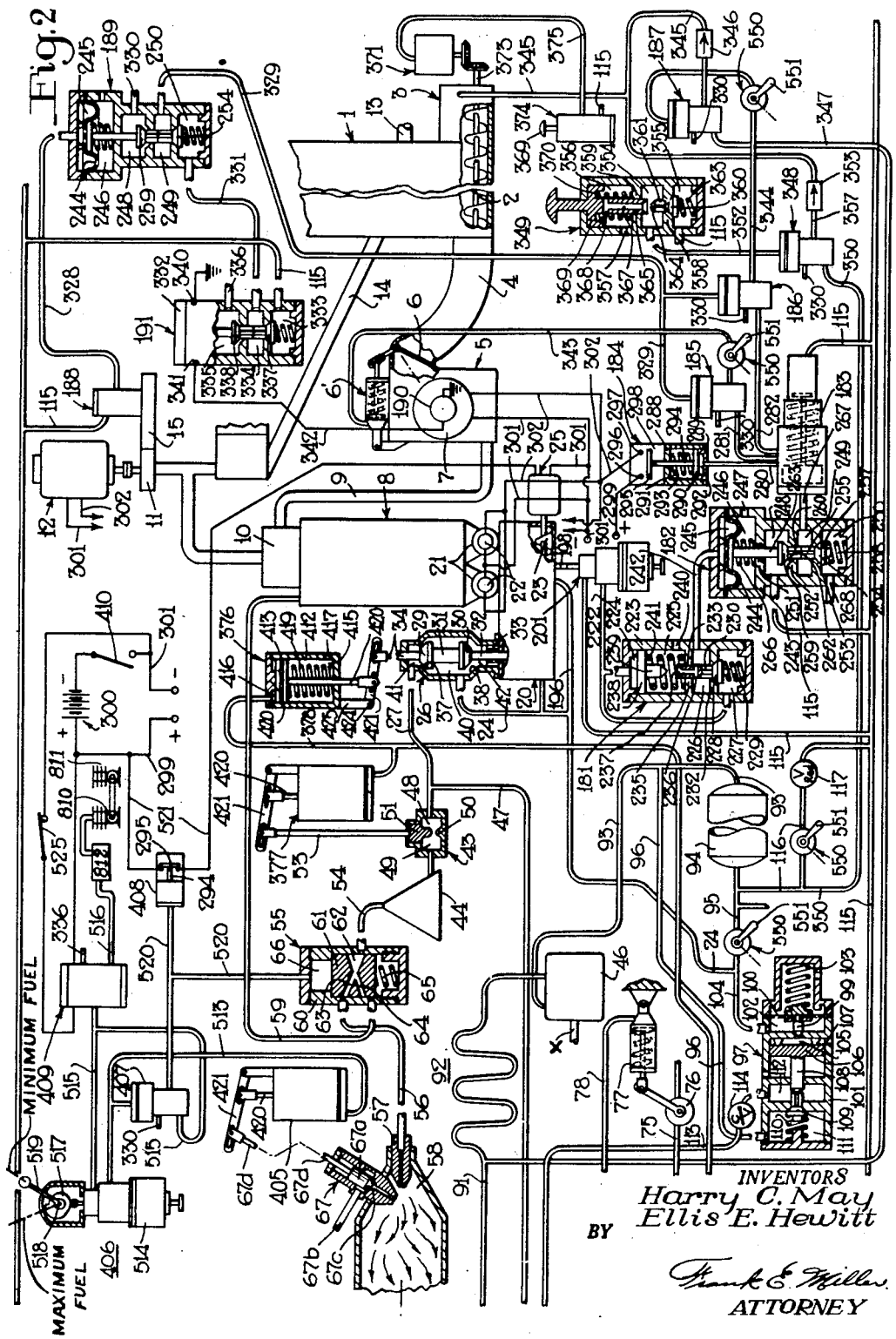

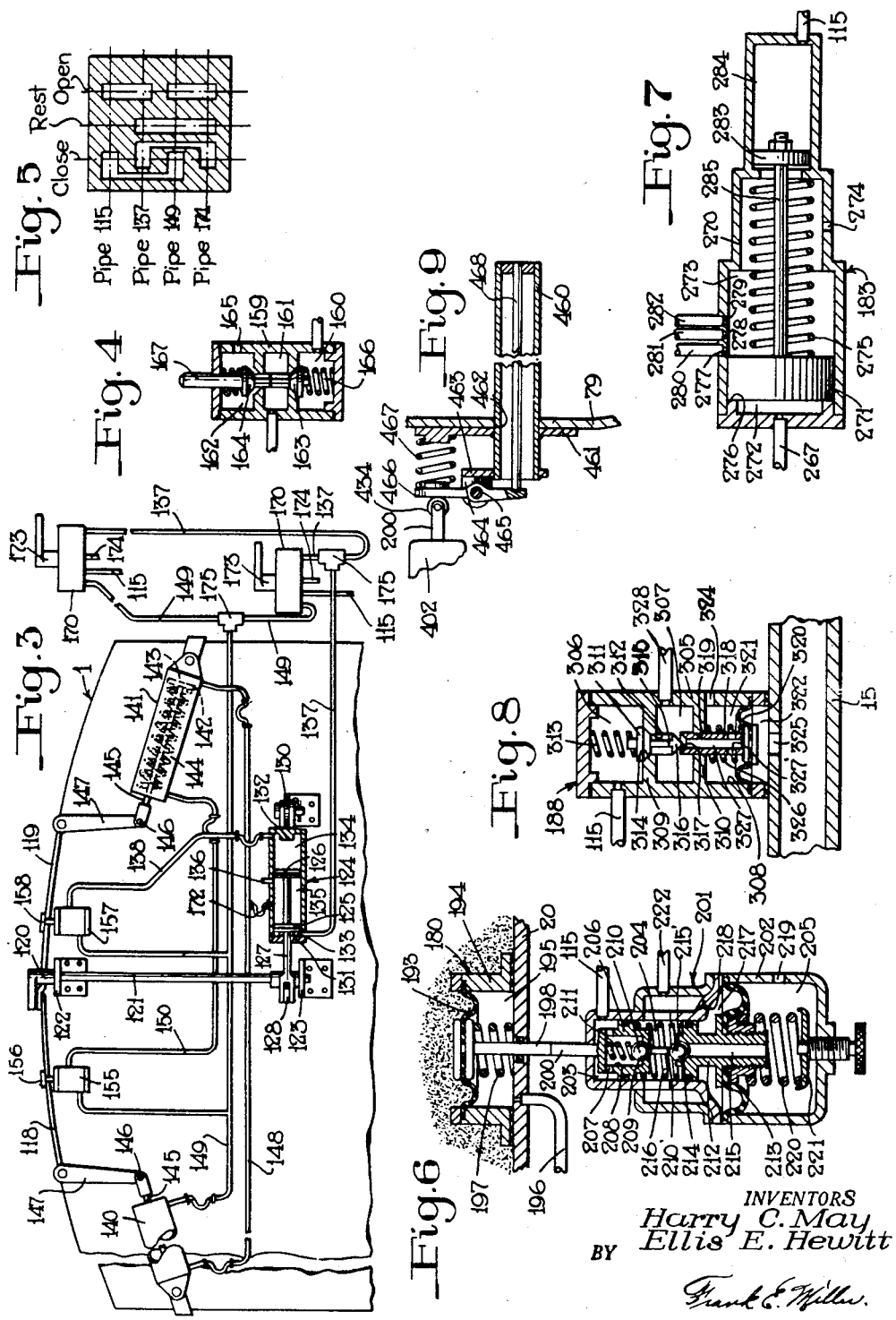

Patented July 3, 1951

2,558,866

UNITED STATES PATENT OFFICE 2,558,866

GAS TURBINE PLANT

Harry C. May, East McKeesport, and Ellis E. Hewitt, Pittsburgh, Pa., assignors to The Westinghouse Air Brake Company, Wilmerding, Pa., a corporation of Pennsylvania Original application April 20, 1948, Serial No. 22,208. Divided and this application September 24, 1949, Serial No. 117,699

8 Claims. (Cl. 290—2)

This invention relates to control apparatus for a gas turbine power plant particularly adapted for use on railway locomotives, the present application being a division of our copending application, Serial No. 22,208, filed April 20, 1948.

It is a principal object of this invention to provide control apparatus for controlling operation of a coal burning gas turbo-electric plant, including coal handling and processing equipment, of the type disclosed in the article "Coal and gas-turbine locomotive" by John I. Yellott and Charles F. Kottcamp appearing in the publication "Railway Age" of June 25, 1947.

It is another object of this invention to provide control apparatus for coal handling and processing equipment comprised in the above-mentioned coal burning gas turbo-electric plant which will automatically assure an adequate supply of processed coal for use as fuel.

It is another object of the invention to provide control apparatus for controlling the power output of the above-mentioned turbo-electric plant.

It is still a further object of the invention to provide control apparatus for controlling the power output of the above mentioned turbo-electric plant in a manner that will assure operation of the turbine comprised therein at a sufficiently high temperature through the major portion of its operating range to take advantage of the higher thermal efficiency at such a temperature.

Other objects and advantages of this invention will appear in the following more detailed description thereof, taken in connection with the accompanying drawings, wherein:

Figs. 1 and 2, with the right hand end of Fig. 1 matched with the left hand end of Fig. 2, is a diagrammatic, part sectional layout of a plant embodying the invention;

Fig. 3 is an elevation view of a bunker door operating mechanism and controls therefor forming a part of said plant;

Fig. 4 is a diagrammatic view, substantially in section, of an interlock valve device comprised in the controls shown in Fig. 3;

Fig. 5 is a schematic diagram of a valve device shown in elevation in Fig. 3;

Fig. 6 is a sectional view of weighing apparatus comprised in the controls shown in Fig. 2;

Fig. 7 is a diagrammatic sectional view of a timing cylinder device comprised in the controls shown in Fig. 2;

Fig. 8 is a diagrammatic sectional view of an interlock valve device comprised in the controls shown in Fig. 2; and Fig. 9 is a diagrammatic sectional view of a temperature sensitive actuator device, also comprised in the controls shown in Fig. 2.

In the following description like parts are designated by like numerals in all figures in the drawings.

*General description of coal burning gas turbo-electric power plant, including coal handling equipment comprised therein*

Referring more particularly to Figs. 1 and 2 in the drawings, in the coal burning gas turbo-electric power plant, including coal handling equipment comprised therein, which forms no part of this invention, a coal bunker 1 is provided for storing coal to be used as fuel for operation of the plant. A worm feed stoker 2 is located at the bottom of the bunker 1, arranged to be rotated by an air operated stoker motor 3 for feeding coal from the bunker 1 into the lower end of a duct 4 and through same to the top of a coal crusher device 5. A gate 6 is provided for opening and closing the duct 4 to the crusher device 5. Gate 6 is arranged to be operated to an open position by a cylinder 6' upon supply of fluid under pressure thereto.

The crusher device 5 comprises crushing means (not shown), such as a high-speed hammermill or the like, arranged to be driven by an electric motor 7 for reducing the size of the coal to small particles which collect in the bottom of the crusher device.

The crushed coal particles in the bottom of the crusher device are conveyed to the top of a first storage tank 8 through a conduit 9 and a centrifugal type separator device 10 by means of a suction air stream. The separator device 10 is provided for separating the crushed coal from the conveying air, and a centrifugal type suction fan 11 is arranged to be operated by an electric motor 12 to provide suction for moving said conveying air, as well as for moving a certain amount of drying air through the coal bunker 1 via ducts 13 and 14. A duct 15 is provided for conveying air discharged from the suction fan 11 to an exhaust stack or the like.

From the first storage tank 8, which may be at slightly less than atmospheric pressure, the crushed coal storage therein is fed into a pressurized coal storage tank 20 which may be at a pressure of one hundred fifty pounds, for example. Coal pumps 21 are arranged to be driven by electric motors 22 for feeding the crushed coal from the storage tank 8 at low pressure into the storage tank 20 at the higher pressure. Detail of the coal pumps is now shown, but said pumps may be in the form of a rotatable element having a cavity formed therein arranged to fill with coal when exposed to the tank 8 and to dump said coal upon subsequent exposure to tank 20.

Crushed coal in the pressurized coal storage tank 20 is fed by a worm feed stoker 23 into a line 24 in which compressed air at say one hundred fifty pounds is caused to flow, as will hereinafter be pointed out. An electric motor 25 is provided for driving the worm feed stoker 23.

Pulverized coal thus fed into the line 24 is conveyed by the compressed air flowing therein into a coal feed regulator device 26 which is adapted to regulate the supply of air-conveyed coal from the line 24 to a feed line 27, by-passing any excess back into the storage tank 20.

The regulator device 26 may comprise a feed valve 29 and a by-pass valve 30, both substantially in the shape of a frustrated cone or modified form of needle valve, connected one with the other by a rigid element 31. A stem 32 may be secured at one end to valve 30 and is reciprocably disposed within a suitable bore in a sleeve member 33 for guiding movement of the valves. An operating stem 34 may be provided for actuating the valves 29, 30. The opposite end of stem 34 may be disposed outside the casing of device 26 for pivotal connection to an operating lever of an actuating device, as will be described in detail hereinafter. Movement of stem 34 moves valves 29 and 30 toward or away from respective valve seats 37 and 38, according to direction of such movement. As valve 29 is moved toward seat 37 by upward movement of stem 34, valve 30 is simultaneously moved away from seat 38. Line 24 opens into a supply chamber 40 intermediate the two valve seats, while feed line 27 is open to a delivery chamber 41 on the outlet side of seat 37, with a return chamber 42 on the outlet side of seat 38 opening into the top of tank 20. The air-conveyed coal supplied to chamber 40 is distributed to chambers 41 and 42 in accordance with proximity of the valves 29 and 30 to the respective seats 37 and 38, as will be appreciated.

The air-conveyed coal flowing in feed line 27 is expanded through an adjustable nozzle device 43, where the pressure drops from one hundred fifty pounds to about seventy pounds, into a conical attrition chamber 44. The compressed air which has permeated into the pores of each coal particle while passing through line 27 cannot escape rapidly enough to instantaneously attain the pressure in the attrition chamber, after passing through the nozzle device 43, and so it shatters the coal into tiny fragments. The use of a conical attrition chamber after the nozzle device 43 further reduces the size of the particles. The fineness of the product depends upon the pressure drop in the nozzle device, upon the inlet air temperature, and upon the amount of conveying air used per pound of coal. Coal of low grindability requires a higher air-to-coal ratio than coal of high grindability, so the nozzle device is made adjustable to allow the air-to-coal ratio to be maintained at a suitable value as the coal flow varies. The conveying air to line 27 is supplied by a booster compressor 46 driven by a variable speed turbine 45, whereby the pressure at the inlet to nozzle device 43 will tend to vary with speed of the booster compressor which is substantially dependent upon the amount of fuel supplied, but by adjustment of the flow area of said nozzle device the proper pressure drop therethrough may be maintained for any given amount of fuel and supply of conveying air to line 27, as will be more fully described hereinafter. A hot air line 47 is connected to the feed line 27 at the inlet side of the nozzle device 43 to aid in obtaining a desirable temperature of air and fuel.

The adjustable nozzle device 43 may comprise a casing having an inlet chamber 48 to which the feed line 27 is connected, and an outlet chamber 49 connected to the attrition chamber 44. A variable area throat may be formed intermediate the chambers 48 and 49 by an element 50 fixed to the interior of the casing in the path of flow of coal and conveying air admitted to chamber 48, and by an adjustable element 51 projecting into said path of flow opposite to element 50. Adjustable element 51 may comprise a cylindrical portion slidably mounted in a suitable bore in the casing and attached to an operating rod 53 extending outwardly through the casing; the outer projecting end of rod 53 being adapted for pivotal connection to an actuator, as will be described in detail hereinafter, to position the adjustable element 51.

The atomized coal and conveying air leaves the top of the attrition chamber 44 and, via a pipe 54, enters a by-pass control valve device 55, which, during normal running operation of the plant, connects said pipe 54 via another pipe 56 to a nozzle 57 for supplying the fine particles of coal to a combustion chamber 58. The by-pass control valve device 55 is operative, during starting of the plant with fuel oil, as will be later described, to disconnect the pipe 56 from the pipe 54 and to connect the latter pipe to a return pipe 59 connected to the top of the first storage tank 8. Thus, during starting, any coal and/or conveying air supplied to the feed line 27 by-passes the combustion chamber 58 and is returned to the storage tank 8 while said combustion chamber is warmed up on an oil flame, as will be pointed out.

The by-pass control valve device 55 may comprise a casing 60 in which is disposed a piston slide valve 61, or the like, having an inlet port 62, which is constantly open to the pipe 54 from the attrition chamber 44, and two separate outlet ports 63, 64 connected to port 62, may be provided for registry with pipes 56 and 59, respectively. In a first position of the valve 61, port 63 registers with pipe 56 while port 64 is blanked off, and in a second position, the port 63 is blanked off and port 64 registers with the return pipe 59. A compression spring 65 may be arranged to urge valve 61 in the direction of its first position, and by supply of fluid under pressure to a chamber 66, action of said spring may be overcome to move said valve to its second position. Upon venting of fluid under pressure from chamber 66, the spring 65 returns valve 61 to its first position, in which it is shown in the drawing.

A fuel oil nozzle device 67 is provided for supplying fuel oil to the combustion chamber 58 for warm-up of the turbine 45 during starting and for supporting a pilot flame to assure combustion of coal during running operation of said turbine. Nozzle device 67 is provided with a needle valve 67a for regulating flow of fuel oil from a pressurized source (not shown) via a pipe 67b to the combustion chamber 58. By advancing the needle valve 67a toward a seat 67c the amount of fuel oil to the combustion chamber 58 is reduced. By moving valve 67a away from seat 67c the amount of fuel oil to chamber 58 is increased. A stem 67d is provided to allow for adjustment of the needle valve 67a. One end of stem 67d is attached to the needle valve, while the opposite end is adapted to be connected to an actuator device for effecting the adjustment of said valve, as will be described hereinafter.

Coal and air supplied via nozzle 57 to the combustion chamber 58, as well as fuel oil supplied via nozzle device 67, in burning, form hot expansible combustion gases which are mixed with compressed air discharged from a main compressor 68 driven by the turbine 45. The mixture of compressed air and hot combustion gases are passed through a separator 69, which may be of the centrifugal type, where particles of fly ash generated by combustion of coal in the combustion chamber are removed from said gases. The ash falls to the bottom of the separator 69 where it collects. A hopper 70, open at its bottom to atmosphere, is provided to receive and allow for removal of accumulated ash. A normally closed gate 72, arranged to be actuated to an open position by a fluid pressure actuated cylinder device 73 is provided for controlling entrance of ash into hopper 70 from the bottom of the separator. Means are provided for watering down the ash before leaving the hopper 70 in the form of a spray device 74 disposed in said hopper and being adapted to be supplied with water via a pipe 75. A valve device 76, interposed in pipe 75, provides for control of water from a source (not shown) to the spray device 74. A fluid pressure cylinder device 77 is adapted and arranged to actuate valve device 76 to an open position at substantially the same time that gate 72 is opened by cylinder device 73, there being a fluid pressure control line 78 connected in common to both cylinder devices. Control of supply and release of fluid under pressure to and from line 78 may be effected by a manually operable valve device 78'.

Hot expansible gases leaving the separator 69 are fed into an inlet to the turbine 45 via an inlet duct 79, or the like, and after expanding through said turbine, may leave same via an exhaust duct 80 and one side of a regenerator 81, after which the now expanded gases may pass to the atmosphere. In expanding, the hot gases drive the turbine 45 which in turn drives the main compressor 68, the booster compressor 46, and an electric generator 83. Atmospheric air is admitted into the compressor 68 at 84, and, after being compressed in passing therethrough, is conveyed via a duct or ducts 85 into the opposite side of the regenerator 81 where it is pre-heated by exhaust gases from the turbine 45 before mixing with the combustion gases for admission to the turbine, as was previously mentioned.

The electric generator 83 may be of the direct current type, which, driven by the turbine 45, generates current for operating an electric driving motor 86 to produce motive power for driving the locomotive. An auxiliary generator 87, also driven by turbine 45, is provided for producing current for exciter windings 89 of the generator 83. A field rheostat 88 is provided for controlling current from the auxiliary generator 87 to the exciter windings 89. By movement of an arm 90 of rheostat 88, resistance coils 88' may be cut in or out of the field circuit in the well-known manner. Rheostat 88 is so adapted and arranged that by turning movement of arm 90 in a counterclockwise direction about a fixed point 88a, resistance in the generator field circuit may be reduced to allow for greater excitation of the exciter windings 89. In the position in which arm 90 is shown in the drawing excitation of the generator field windings will be at a minimum.

The booster compressor 46, shown in outline in Fig. 2, may provide a source of supply of compressed air for brakes on the locomotive and train as well as for the control apparatus for the plant, which latter will be described hereinafter. Compressed air is taken from the duct 85 on the discharge side of the main compressor 68 via a pipe 91, after passing through cooling coils 92, or the like, to furnish intake air for the booster compressor 46. Discharge from the booster compressor 46 may be fed into a line 93 to a fluid pressure storage reservoir 94 at about one hundred fifty pounds, for example. By way of a pipe 95, conveying air at reservoir pressure of one hundred fifty pounds is supplied from the reservoir 94 to the line 24 for supplying conveying air for crushed coal introduced into said line. Air is supplied to a pipe 96 from the line 93 and circulated via a hot air regulator device 97 and coils 98 disposed in the path of hot turbine exhaust gases in the duct 80 to furnish hot air for supply to the hot air line 47 connected to feed line 27 as was previously mentioned.

According to a feature of the invention, the hot air regulator device 97 is provided to control the hot air feed to the hot air line 47 in accordance with the pressure of air in the reservoir 94 in order to assure that sufficient conveying air will be supplied to the line 24 for conveying crushed coal to the adjustable nozzle 43. The device 97 is normally open until pressure of air in the reservoir 94 drops to one hundred forty pounds, for example, whereupon it will close off supply of air to the hot air line 47.

Device 97 may comprise a control valve 99 secured to move with a diaphragm 100 disposed within a casing 101. One side of diaphragm 100 may be subjected in a chamber 102 to air at the pressure in reservoir 94 via pipes 104 and 95, while the opposite side is subject to pressure of a control spring 103. Valve 99 is adapted to cooperate with a valve seat for controlling a communication between chamber 102 and a chamber 105 at one side of a piston 106. When pressure of air in chamber 102, i. e., reservoir pressure, is above one hundred and forty pounds, due to action of said pressure on diaphragm 100, the valve 99 will be unseated and the pressure of fluid in chamber 105 will equal that in chamber 102, as a consequence of which piston 106 will be held in a displaced position. When pressure of air in chamber 102 acting on diaphragm 100 drops below one hundred and forty pounds, spring 103 will close valve 99, thus shutting off chamber 102 from chamber 105, whereupon pressurized air in the latter chamber will leak to atmosphere via a small port 107 in casing 101, allowing piston 106 to return to its rest position in which it is shown in the drawing. A stem 108 is attached to piston 106 which cooperates with a supply valve 109 for holding same unseated when said piston is held in its displaced position. A spring 110 urges valve 109 to a closed position when air is vented from chamber 105, and urges piston 106 to return to its rest position. Valve 109 controls a communication between a supply chamber 111 connected to the pipe 96 and a delivery chamber 112 connected via a pipe 113 to the coils 98. A check valve device 114 is inserted in the pipe 113 to prevent back flow of pulverized coal and air from feed line 27 via hot air line 47, coils 98 and pipe 113 into the regulator device when the valve 109 is closed so that said regulator device will not become clogged with coal.

Compressed air for a control supply line 115 is taken from the reservoir pipe 95 by way of a pipe 116. A reducing valve 117 may be inserted in pipe 116 for reducing pressure of air at reservoir pressure of one hundred and fifty pounds to a suitable value such as sixty pounds in line 115 for use in the control system.

The coal bunker 1, a portion of which is shown in elevation in Fig. 3, may be in the form of a substantially rectangular tank for storing coal therein. Doors 118, 119 are provided at the top of the bunker, hinged at their outer edge, and arranged to be swung upwardly on their hinges to open the bunker for adding coal. To provide a weather-tight seal, the bunker door 119 overlaps the door 118 in their closed position. To lock the bunker doors closed, a latch 120 engages the overlapping edges of said doors in closed position. Latch 120 may be secured to one end of a rod 121 pivotally mounted in brackets 122, 123 spaced apart and secured to an end wall of the bunker. By turning movement of rod 121, the latch may be brought into and out of engagement with the uppermost overlapping bunker door 119 for respectively locking and unlocking same. For actuating the rod 121 a latch operating cylinder 124 is provided which may contain two pistons 125, 126 spaced apart and rigidly secured one with the other by means of an operating rod 127 common to both. The rod 127 extends outwardly from the cylinder 124 and may be pivotally connected to a lever 128 attached to the end of rod 121, so that reciprocal movement of rod 127 will cause turning movement of rod 121. The casing of the cylinder 124 may be pivotally connected to an arm 130 secured to the bunker wall to allow necessary freedom for turning movement of lever 128. The pistons 125, 126 are so adapted and arranged that when latch 120 is in its locked position, in which it is shown in the drawing, piston 125 lies adjacent an end wall 131 of cylinder 124, with piston 126 disposed away from an opposite end wall 132 of said cylinder. Within the cylinder 124, the wall 131 serves to define, with piston 125, a pressure chamber 133, and end wall 132 serves to define a pressure chamber 134 with piston 126. An atmospheric chamber 135 is formed within the cylinder intermediate the two pistons, a port or pipe 136 being provided to open said chamber to the atmosphere. A control pipe or line 137 is provided for supplying and releasing fluid under pressure to and from the pressure chamber 133, and another pipe or line 138 is provided for supplying and releasing fluid under pressure to and from the pressure chamber 134. While chamber 134 is vented to the atmosphere, if fluid under pressure is supplied to the chamber 133, the pistons 125, 126 and rod 127 are caused to move in the direction of the first mentioned chamber to effect unlocking of the latch 120. Conversely, if chamber 133 is vented to the atmosphere and chamber 134 supplied with fluid under pressure, the pistons 125, 126 and rod 127 are caused to move in the direction of the first mentioned chamber for moving the latch 120 back to its locked position.

To operate the bunker door 118, a fluid pressure cylinder device 140 may be provided, while a similar cylinder device 141 may be provided for operating the door 119. Cylinder devices 140, 141 may comprise a piston 142 (shown in broken outline) having a door opening chamber 143 at one side and a door closing chamber 144 at the opposite side. A rod 145 attached to piston 142 is pivotally connected at 146 to a lever 147 secured to the respective bunker door. Assuming the bunker doors to be unlatched, and with the door closing chambers 144 vented to atmosphere, by supply of fluid under pressure to the door opening chambers 143 in the cylinder devices 140, 141 the pistons 142 and attached rods 145 are caused to move outwardly, and acting through levers 147, open the bunker doors 118, 119. By subsequently venting the door opening chambers 143 to atmosphere and supplying fluid under pressure to the door closing chambers 144 in cylinder devices 140 and 141, in a similar manner, the bunker doors 118, 119 are caused to close. A control pipe or line 148 is connected to the door opening chambers 143 in both cylinder devices 140, 141 at each side of the bunker for conveying fluid under pressure thereto and therefrom. For conveying fluid under pressure to and from the door closing chamber 144 in the cylinder device 140, a pipe or line 149 is provided, and to serve the same purpose with respect to cylinder device 141, a pipe or line 150 is provided.

According to the invention, I provide controls which assure the proper sequence of operation of the door latch 120 and door operating cylinder devices 140, 141 on each side of the coal bunker in effecting opening and closing of the bunker doors.

An interlock valve device 155 is provided at the end of the bunker door 118. Valve device 155 may be secured to an end wall of the bunker in such a manner as to be operable by a projecting element 156 carried by the door 118. Similarly, an interlock valve device 157 is disposed at the end of the bunker door 119 and secured to the end wall of the bunker. A projecting element 158 is provided on the door 119 and secured thereto for operating the valve device 157.

Referring to Fig. 4, each of the interlock valve devices 155, 157 may comprise a casing 159 having a chamber 160, a chamber 161, and an exhaust chamber 162 formed therein. A valve 163 is provided for controlling communication between the chamber 160 and the chamber 161, and a valve 164 is provided for controlling communication between the chamber 161 and the exhaust chamber 162 which is open to atmosphere via an exhaust port 165 in the casing. A control spring 166 is arranged to urge the valve 163 to a normally closed position, while the exhaust valve 164 is held in a normally open position. An operating stem 167 is secured to the exhaust valve 164 and projects outside the casing. The valves 163, 164 are so arranged that when the stem 167 is displaced inwardly of the casing 159, the valve 164 is seated and the valve 163 unseated. Chamber 160 of the interlock valve device 155 is connected to the pipe 149. The chamber 161, of the interlock valve device 155, is connected to the pipe 150. When door 118 is closed, stem 167 of device 155 will be depressed, valve 164 will be closed, valve 163 will be open, and therefore pipe 149 will be connected to pipe 150 via said device 155. When the door 118 is opened, element 156 secured to said door will leave stem 167 of device 155 and allow valve 163 to close and valve 164 to open so that the pipe 150 is opened to atmosphere via chambers 161, 162 and exhaust port 165.

The chamber 160 of interlock valve device 157 is connected to the pipe 149, but the delivery chamber 161 of said device is connected to the pipe 138. A pipe 172 is connected to the pipe 148 and to the cylinder device 124 in such a manner that after piston 125 is caused to move a distance away from end wall 131 sufficient to cause the latch 120 to move out of locking position, said pipe will open to chamber 133.

For controlling operation of the bunker door operating mechanism, two selector valve devices 170 are provided which may be located at any convenient position remote one from the other. Either of the selector valve devices is operable manually by a respective operator's handle 173 to control communication between the pipes 149, 137 and a fluid pressure supply pipe, such as a branch of the control supply pipe 115, and an exhaust pipe 174. Details of the valve devices 170 are not shown, but each may be of the well-known rotary valve type.

Referring to Fig. 5, the rotary valve may be moved by handle 173 to any one of three positions which may be called "open," "rest," and "close." In "open" position, the valve device 170 connects pipe 115 to pipe 137 and pipe 149 to pipe 174. In "rest" position, device 170 connects pipes 137, 149 to pipe 174, while pipe 115 is blanked off. In "close" position, device 170 connects pipe 149 to pipe 115 and pipe 137 to pipe 174.

With the selector valve devices 170 in "rest" position, the doors 118, 119 closed, and the latch 120 in locked position, if it is desired to open the doors to supply coal to the bunker 1, for example, the operator's handle 173 of either selector valve device 170 may be moved to "open" position, whereupon fluid under pressure from the line 115 is supplied to the line 137 while pipe 149 remains open to the exhaust pipe 174. Fluid under pressure thus supplied to the line 137 flows into chamber 133 in the latch operating cylinder device 124 where it acts on piston 125 to cause its movement in the direction of chamber 135 for effecting movement of latch 120 to an unlocked position. At the same time, chamber 134 is open to the atmosphere via pipe 138, and valve device 157. In thus moving, piston 125 opens pipe 172 to chamber 133, so that fluid under pressure then flows from said chamber into pipe 148 via said pipe 172, whence it flows into the door opening chambers 143 in the cylinder devices 140, 141. At this time, chamber 144 in device 140, will be open to atmosphere by way of pipe 149 and the respective selector valve device 170, and chamber 144 in device 141 will be open to the atmosphere by way of pipe 150, valve device 155, and pipe 149, so that fluid under pressure thus supplied to chambers 143 in the devices 140, 141 causes the bunker doors 118, and 119 to open. As the doors open, the interlock valve devices 155 and 157 assume positions in which respective pipes 138 and 150 are vented to the atmosphere locally by way of port 165 in said devices.

When it is desired subsequently to close the bunker doors 118, 119, the respective selector valve device 170 is moved to "close" position, opening pipe 137 to exhaust pipe 174 and connecting pipe 149 to the supply line 115. Fluid under pressure in the door opening chambers 143 of cylinder devices 140, 141 is thus vented to the atmosphere via pipes 148, 172, chamber 133 in cylinder device 124, pipe 137, and pipe 174 in the selector valve device 170. Fluid under pressure supplied to the pipe 149, will flow to the chamber 160 of interlock valve device 155, the chamber 160 in device 157, and to the door closing chamber 144 of cylinder device 140, wherein the pressure of fluid acting on the piston 142 effects closure of the door 118 through the lever 147 and rod 145. With closure of door 118, the projecting element 156 carried by said door is brought into engagement with stem 167 of device 155, displacing said stem inwardly. As previously described, the valve 164 in device 155 is closed by inward movement of stem 167 while the valve 163 is opened, so that pipe 149 is now connected to pipe 150 by way of chambers 160, 161. Fluid under pressure from pipe 149 will now flow into pipe 150 to the door closing chamber 144 in cylinder device 141 to effect closure of the door 119 in manner similar to that previously described, overlapping door 118. It will be seen that by means of the control means herein disclosed, closure of the bunker doors is effected sequentially so that door 119 overlaps door 118 in order to obtain the proper closure. When door 119 is closed, through displacement of stem 167 in interlock valve device 157 by the projecting element 158 carried by said door, as was previously described, the pipe 149 is connected via said device 157 to the pipe 138. Fluid under pressure will then flow from pipes 149, 138 into chamber 134 of the cylinder device 124, whereupon the pressure of said fluid acting on piston 126 will effect movement of the latch 120 to locked position. The handle 173 in the respective selector valve device 170 may then be returned to "rest" position, venting both pipes 149 and 137 to the atmosphere.

It will thus be seen that means are provided whereby unlocking and opening, and closing and locking of the bunker doors is automatically effected in the proper sequence by selective positioning of an operator's selector valve device 170.

By means of double check valves 175 inserted in branches of the pipes 149 and 137 connected to respective valve devices 170, one of said devices 170 is isolated from the sysytem when the other of said devices 170 is operated.

According to other features of the invention, control of supply of crushed coal to the storage tank 20 is carried on automatically. Means are provided whereby, when the weight of coal in tank 20 drops below a certain value, the coal processing equipment is brought into operation, and upon establishment of the desired weight of coal in tank 20 said equipment is rendered inoperative. In bringing the coal processing equipment into operation, the suction fan 11, crusher 5, and coal pumps 21 are started, then the crusher gate 6 is opened, and finally the air operated stoker motor 3 is started. Interlock means are provided in the control system which positively prevent opening of the crusher gate 6 and starting of the stoker motor 3 before the crusher and suction fan are first brought up to speed. Were coal supplied to the crusher before same was running, said coal might jam the crusher, and prevent its starting. If the crusher were brought into operation before the suction fan was operating to remove crushed coal, the crushed coal might accumulate in the crusher to cause faulty operation of the equipment. When the proper weight of coal in tank 20 has been established the equipment is shut down in the reverse order, i. e., first the stoker 2 is stopped, then the crusher gate 6 is closed, and finally the crusher 5, suction fan 11 and coal pumps 21 are stopped. By this order, coal may be cleared substantially from the crusher before shut-down to prevent stalling on a subsequent starting as previously mentioned.

*General description of controls for coal handling portion of plant*

The control means for controlling the operation of the coal processing and handling equipment may comprise a fluid pressure weighing device 180 disposed substantially within tank 20 (Fig. 6) and which is arranged to effect variations in pressure of fluid, through adjustment of a self-lapping valve device 201, in a fluid pressure governor device 181 in accordance with the weight of crushed coal in the pressurized storage tank 20. The governor device 181 is operative in response to a certain reduction in pressure of fluid from the device 181, corresponding to a certain reduction in weight of coal in tank 20, to effect venting of fluid under pressure from a relay valve device 182 for causing fluid under pressure to be supplied to a timing cylinder device 183. The governor device 181 in response to dictates of device 180 will respond to effect supply of fluid under pressure from the relay valve device 182 for causing a corresponding venting of fluid under pressure from the timing cylinder device 183 when the weight of coal in tank 20 is subsequently increased to its desired value.

The timing cylinder device 183 is adapted, in response to supply of fluid under pressure from relay valve device 182 to successively effect supply of fluid under pressure, first, to a fluid pressure switch device 184 which effects starting of suction fan 11, crusher 5, and coal pumps 21, second, to a supply chamber of a normally closed relay valve device 185 which controls supply of fluid under pressure to the crusher gate operating cylinder 6', and third, to a supply chamber of a normally closed relay valve device 186 which controls supply of fluid under pressure to a second fluid pressure relay valve device 187 which in turn controls supply of fluid under pressure to the air operated stoker motor 3.

When the suction fan 11 comes up to operating speed, an interlock valve device 188, sensitive to pressure of fluid in the discharge duct from said fan, responds to effect supply of fluid under pressure to a diaphragm control chamber of a relay valve device 189 which responds thereto to open a supply chamber therein to a delivery chamber connected to the respective diaphragm control chambers in the relay valve devices 185, 186. An electric generator device 190 is driven by the crusher motor 7, so that when said crusher motor is up to operating speed the current output from said generator device is sufficient to cause energization of a magnet valve device 191 which responds to effect supply of fluid under pressure to the supply chamber of the relay valve device 189 and thereby to the diaphragm control chambers of the relay valve devices 185, 186 to cause these to assume an open position, connecting their respective supply chambers to the gate operating cylinder 6' for opening the crusher gate 6 and to the relay valve device 187 for effecting supply of fluid under pressure to the air operated stoker motor 3 for operating same.

When fluid under pressure subsequently is vented to atmosphere by the relay valve device 182 from the timing valve device 183, said device 183 will respond to successively vent to atmosphere fluid under pressure from, first, the open relay valve device 186, hence relay valve device 187 for terminating supply of fluid under pressure to the air operated stoker motor 3, second, the open relay valve device 185, hence from the gate operating cylinder 6' for closing the crusher gate 6, and third, the switch device 184 for breaking electrical contact to effect stopping of the suction fan 11, crusher 5, and coal pumps 21.

*Detailed description of controls for coal handling portion of plant*

Referring to Fig. 6, the weighing device 180 disposed substantially within the tank 20, may comprise a diaphragm 193 clamped between two sections of a substantially cylindrical casing element 194 secured to the bottom of the tank 20. The diaphragm may be so arranged as to be subject on its upper side to pressure of fluid in the tank as well as to the weight of a column of crushed coal stored in the tank and resting on the diaphragm. On its underside, the diaphragm may be subject to pressure of fluid in a chamber 195 within casing element 194, and said chamber may be connected to the feed line 27 by a pipe 196 so that pressure of fluid on opposite sides of the diaphragm at all times will then be equal, since the fluid in tank 20 is also at feed line pressure. Thus the diaphragm 193 will be deflected only in accordance with changes in amount of coal in tank 20 as reflected in the weight of the column of coal above said diaphragm, since any change in feed line pressure will occur on both sides of the diaphragm. A compression control spring 197 may be provided, disposed within chamber 195 and interposed between the bottom of tank 20 and the underside of the diaphragm, for establishing the degree to which said diaphragm may deflect for any given weight of coal above it. A stem 198 may be secured for movement with the diaphragm 193 for adjusting the position of an operating stem 200 of a self-lapping valve device 201 in accordance with the weight of coal in tank 20. Stem 198 may extend through the chamber 195 and a suitable bore in the bottom of the tank. A resilient sealing ring may be disposed in a groove in the bore for slidable sealing engagement with the stem 198 to prevent leakage of fluid under pressure from chamber 195 to the atmosphere.

The self-lapping valve device 201 may comprise a casing 202 having a supply chamber 203, a delivery chamber 204, and an exhaust chamber 205 therein. A supply valve seat element 206, attached to operating stem 200 for movement therewith, is adapted for reciprocable movement within the casing 202. Element 206 is open at one side to the supply chamber 203 by way of ports 207 and a cavity 208, and at its opposite side to the delivery chamber 204 by way of a supply valve seat 209. A supply valve 210 in the form of a ball may be disposed within cavity 208 for controlling communication between the supply chamber 203 and the delivery chamber 204. A bias spring 211 is disposed in the cavity 208 for urging the valve 210 toward a normally closed position on seat 209. An exhaust valve seat element 212, secured for reciprocable movement with a diaphragm 213, is open at one end to the delivery chamber 204 by way of an exhaust valve seat 214 formed therein. Valve seat element 212 extends through the diaphragm and opens into the exhaust chamber 205 by way of a central opening 215 extending from end to end. An exhaust valve 215' connected to the supply valve 210 by a pin 210' and in the form of a ball is disposed in delivery chamber 204 to cooperate with the seat 214 in element 212 for controlling communication via opening 215 between said delivery chamber and the exhaust chamber 205. A bias spring 216, disposed in the delivery chamber 204, may be interposed between seat elements 206, 212 for biasing the seat element 206 in the direction of chamber 203. The diaphragm 213 is subject on one side to pressure of fluid in a diaphragm chamber 217, which pressure of fluid is that of the delivery chamber 204, the two chambers being connected one to the other by way of a choke 218. The opposite side of the diaphragm 213 is exposed to atmosphere in the exhaust chamber 205, said exhaust chamber being open to the atmosphere by way of a port 219 in the casing. A compression control spring 220 is disposed in the exhaust chamber 205, interposed between the diaphragm and an adjustable spring seat element 221, for determining the degree of deflection of said diaphragm for any given pressure condition in the delivery chamber 204. The adjustable spring seat 221 is provided to allow for changing the precompression of the control spring 220.

In operation of the self-lapping valve device 201, when operating stem 200 is moved inwardly of the casing 202 a certain distance and held there, the attached seat element 206 is moved downwardly, as viewed in the drawing, while the supply valve seat 209 formed in the end of element 206 is moved away from the supply valve 210. At this time supply valve 210 will remain stationary due to seating engagement of the attached exhaust valve 215' on seat 214 of element 212. After the supply valve seat 209 moves away from the supply valve 210, supply chamber 203 is opened to delivery chamber 204 by way of the ports 207, cavity 208 and seat 209. Fluid under pressure supplied to the supply chamber 203 from any suitable source will then flow into the delivery chamber 204 where the pressure of fluid will thus be caused to increase. Pressure of fluid in diaphragm chamber 217 will increase with that in the delivery chamber 204, the former chamber being open to the latter by way choke 218. Pressure of fluid in diaphragm chamber 217, being greater than the atmospheric pressure in chamber 205 will deflect diaphragm 213 against action of spring 220 in the direction of the last named chamber. Deflection of diaphragm 213 will carry the exhaust valve seat element 212 with it. Bias spring 211 will cause the supply valve 210 and exhaust valve 215' to follow movement of element 212, while said exhaust valve remains seated on seat 214 in the end of said element, until said supply valve seats on seat 209 in element 206. Upon seating of the supply valve 210, the supply chamber 203 is closed to the delivery chamber 204 and further increase in pressure in the last named chamber thereby will be prevented. In absence of further increase in delivery pressure in the diaphragm chamber 217, the pressure force on its one side will balance with spring force on its opposite side and further deflection of said diaphragm will cease. The supply valve 210 and the exhaust valve 215' remain seated. If, at this time, the stem 200 were moved inwardly a greater amount, element 206 would again be moved downwardly to unseat from the supply valve 210, the above described action would repeat, and an increase in pressure of fluid would be secured in the delivery chamber 204. The pressure of fluid thus obtained in the delivery chamber 204 will vary in substantial proportion to the degree of inward movement of the operating stem 200. The minimum pressure which will be held in the delivery chamber 204 will depend on the degree of precompression of the control spring 220 which may be changed by adjusting position of the spring seat element 221.

If, subsequently, the operating stem 200 is allowed to be moved outwardly of the casing by action of spring 216 to a more extended position, the supply valve 210 and attached exhaust valve 215' will be carried with it. The exhaust valve 215' is thus unseated from seat 214 in element 212 and the delivery chamber 204 thereby opened by way of opening 215 in said element to exhaust chamber 205. Delivery pressure in chamber 204 is thus caused to reduce, and such reduction, reflected in the diaphragm chamber 217, allows the control spring 220 to deflect the diaphragm 213 upwardly. Upward deflection of the diaphragm 213 carries the element 212 into engagement with the exhaust valve 215'. The delivery chamber 204 is thus closed off from the exhaust chamber 205 and further reduction in delivery pressure prevented. The diaphragm 213, therefore, ceases further deflection, and both the supply valve 210 and exhaust valve 215' remain seated. A reduced delivery pressure, determined by position of the operating stem 200, is thus secured.

Summarizing action of the self-lapping valve device 201, it will be seen that with the proper adjustment of spring 220 and with fluid at adequate pressure in chamber 203, the pressure of fluid in the delivery chamber 204 will vary in accordance with position of element 206 as determined by position of the attached stem 200. For example, assume that the chamber 203 is connected to a source of fluid at a pressure of sixty pounds, and it is desired to vary the delivery pressure in chamber 204 in a range between ten pounds and sixty pounds. The spring 220 may be adjusted so that with element 206 in a rest position, ten pounds will be established in delivery chamber 204, and as said element is positioned equal increments in the direction of said chamber by depression of stem 200, the pressure of fluid in said chamber is graduated in correspondingly equal increments until sixty pounds is reached. In the present example, i. e., as long as the pressure of fluid in supply chamber 203 is as great as the maximum pressure desired in the delivery chamber 204, the pressure of fluid in said delivery chamber is determined by position of stem 200.

In the self-lapping valve device 201 the supply chamber 203 is connected to a branch of the control supply pipe 115 for furnishing a source of fluid at a pressure of about sixty pounds, for example. The delivery chamber 204 of device 201 is connected to a combined control and supply pipe 222 in turn connected to the governor device 181. The operating stem 200 is arranged to be positioned by the stem 198 of the weighing device 181. The delivery pressure in the pipe 222 will, therefore, as will be appreciated from the previous description, be varied in accordance with the amount of coal in the tank 20. When the tank 20 is substantially filled with coal, stem 198 of weighing device 180 and hence stem 200 of the self-lapping valve device 201 will be at a lowermost position, as viewed in the drawing, and the delivery pressure in pipe 222 will therefore be at a maximum. As the amount of coal in the tank 20 decreases, the stem 198 of the weighing device 180, and hence stem 200 of the self-lapping valve device 201, will move upwardly, so that delivery pressure in the pipe 222 will be reduced in accordance with the reduction in the amount of coal in said tank 20.

Referring to Fig. 2, the governor device 181 may comprise a casing 223 having formed therein, a control chamber 224, connected to a branch of pipe 222, an exhaust chamber 225, a delivery chamber 226, and a supply chamber 227 connected to another branch of pipe 222. A supply valve 228 disposed in supply chamber 227 is constructed and arranged for controlling communication between said supply chamber and the delivery chamber 226, and a bias spring 229 is arranged to urge the supply valve 228 toward a closed position. The valve 228 may be attached to a fluted stem 230 projecting through a bore in a partition 232 into the delivery chamber 226. An exhaust valve seat element 233, which may be in the form of a hollow rod, is attached to the stem 230 and projects through a bore in a partition 235 which separates chamber 225 from chamber 226. The seat element 233 forms a communication between the delivery chamber 226 and the exhaust chamber 225, said element being hollow and opening into the former chamber via ports 236 and into the latter chamber via an exhaust valve seat 237 formed in the end thereof. A piston 238 is reciprocably disposed within the casing, exposed to pressure of fluid in the control chamber 224 on one side and to atmospheric pressure in chamber 225 on its opposite side, the latter chamber being open to atmosphere via a port 240 in the casing. An exhaust valve 239 is attached to piston 238 for cooperation with seat 237 to control communication between exhaust chamber 225 and delivery chamber 226 via element 233. A compression control spring 241, disposed in exhaust chamber 225, is arranged to urge the piston 238 in the direction of control chamber 224 to a rest position seated against a projecting element formed in an end wall of the casing, in which position it is shown in the drawing.

When pressure of fluid in the pipe 222 is at a minimum, such as is the case when the storage tank 20 is empty and yet to be supplied with coal, the piston 238 is disposed in an uppermost position in which the exhaust valve 239 is disposed a maximum distance away from the seat element 233, and the supply valve 228 is closed. The delivery chamber 226 is therefore closed to the supply chamber 227 and open to the exhaust chamber 225, so that a control pipe 242, connecting said delivery chamber 226 to the relay valve device 182, is open to the atmosphere via said exhaust chamber.

As pressure of fluid in the pipe 222 increases, corresponding to increase in the amount of coal in the storage tank 20, as will be understood, the increasing pressure of fluid in chamber 224 connected to said pipe moves piston 238 and exhaust valve 239 in the direction of the exhaust valve seat element 233 against the opposing action of spring 241. When pressure of fluid in pipe 222 increases sufficiently, corresponding to a desired increase in the amount of coal in tank 20 or at such a time as when said tank is substantially filled, for example, the exhaust valve 239 will engage the seat 237 formed in the end of element 233, closing off delivery chamber 226 to exhaust chamber 225, and, through said element and the attached stem 230, will unseat the supply valve 228 against action of bias spring 229. Fluid under pressure then flows from the supply chamber 227 into the delivery chamber 226, thence into the pipe 242 to the relay valve device 182.

When pressure of fluid in the pipe 222 subsequently reduces, as when the amount of coal in storage tank 20 reduces by supply to the combustion chamber 58, the reduction in pressure in chamber 224 connected to said pipe allows the control spring 241 to become effective to move piston 238 upwardly, as viewed in the drawing, carrying the exhaust valve 239 with it and allowing the bias spring 229 to reseat the supply valve 228, thus closing the delivery chamber 226 from supply chamber 227. Further movement of piston 238 unseats the exhaust valve 239 from the element 233 and again opens the delivery chamber 226 and hence pipe 242 to the atmosphere via exhaust chamber 225.

The relay valve device 182 may comprise a casing 243 having a diaphragm 244 disposed therein subject to pressure of fluid in a diaphragm chamber 245 on one side and to pressure of fluid in a chamber 246 on its opposite side, which latter chamber is open to the atmosphere via a port 247 in the casing. Also formed in the casing are chambers 248, 249 and 250, chamber 248 being separated from chamber 246 by a partition 251 and from chamber 249 by a partition 252. A partition 253 separates chambers 249 and 250. A valve 254 is disposed in chamber 250 for controlling communication between said chamber 250 and the chamber 249. Valve 254 may be secured to a fluted stem 255 slidably mounted in a suitable bore extending through the partition 253, a seat 257 being formed in one end of said bore to accommodate said valve. A bias spring 258 is disposed in chamber 250, arranged to urge the valve 254 in the direction of seat 257. A valve 259, similar to valve 254, may be disposed in chamber 248 for controlling communication between said chamber 248 and the chamber 249, which latter chamber may be considered to be a delivery chamber. For slidably guiding valve 259, a fluted stem 260 is provided which is slidably disposed in a suitable bore opening through partition 252. A valve seat 262 is provided, formed in partition 252 for accommodating the valve 259. Stems 255, 260 project into and meet in the chamber 249 in such a manner that action of bias spring 258 on valve 254, in urging same in the direction of its seat 257, at the same time, through said stems, urges valve 259 in a direction away from seat 262. If valve 259 is seated, valve 254 is consequently unseated. Valve 259 is operatively connected to the diaphragm 244 by means of a rod or stem 263 extending therebetween through a bore in partition 251 in which said rod is slidably disposed. A sealing ring may be provided in partition 251 for slidable sealing engagement with rod or stem 263 to prevent leakage of fluid under pressure past the stem from chamber 248 and to chamber 246. A control spring 266 in chamber 246, arranged to oppose deflection of diaphragm 244 in the direction of chamber 248 as caused by pressure of fluid in chamber 245, is provided for determining the degree of said pressure necessary for effecting operation of valves 254, 259.

In relay valve device 182, diaphragm chamber 245 is connected to the control pipe 242, chamber 248 is connected to a branch to control supply line 115, delivery chamber 249 is connected to a control pipe 267 which is in turn connected to the timing cylinder device 183, while chamber 250 is open to the atmosphere via an exhaust port and pipe 268.

When the control pipe 242, and hence the diaphragm chamber 245 in relay valve device 182, are pressurized, as is so when the amount of coal in the storage tank 20 is sufficient, the diaphragm 244 is deflected in the direction of the chamber 246 so that valve 259 is seated and valve 254 unseated. With valve 259 seated, and valve 254 unseated, delivery chamber 249 and hence pipe 267 are closed to chamber 248 and open to atmosphere via chamber 250 and pipe 268.

When the control pipe 242 and the diaphragm chamber 245 of relay valve device 182 are not pressurized, i. e., when they are open to atmosphere via governor device 181, as is the case when the amount of coal in the tank 20 drops below a certain desired level, the diaphragm 244 will be disposed in a rest position in which it is shown in the drawing, with valve 259 open and valve 254 closed. The delivery chamber 249 and control pipe 267 connected to the timing cylinder device 183, therefore, are then closed to atmosphere via chamber 250 and open to control supply pipe 115 via chamber 248.

Referring to Fig. 7, the timing cylinder device 183 may comprise a casing 270 in which is slidably mounted a piston 271 subject on one side to pressure of fluid in a chamber 272, connected to control pipe 267, and subject on its opposite side to pressure of fluid in a chamber 273 which is open to the atmosphere via a port 274 in the casing. A compression return spring 275 is disposed in chamber 273 and arranged to urge the piston 271 in the direction of chamber 272 toward a normal rest position seated against a stop shoulder 276, in which position it is shown in the drawing. Three ports 277, 278, 279 in the casing normally open into chamber 273 and hence to the atmosphere, with piston 271 in normal rest position. Ports 277, 278, 279 are connected, respectively, to pipes 280, 281, 282 which in turn are connected to, respectively, the switch device 184, the relay valve device 185, and the relay valve device 186. The ports 277, 278, 279, and piston 271 are so arranged that upon movement of said piston in the direction of chamber 273 said piston will travel past said ports, and consecutively expose same to pressure of fluid in chamber 272, and upon its subsequent return past said ports to rest position will consecutively re-expose, in reverse order, said ports to chamber 273. A return piston 283, subject opposingly to atmospheric pressure in chamber 273 and pressure of fluid in a chamber 284, is attached to piston 271 by means of a rod 285 for insuring return of said piston 271 to rest position in the event that return spring 275 should break. Chamber 284 is constantly open to a branch of the control supply line 115.

As hereinbefore described, pipe 267 is non-pressurized or open to atmosphere via relay valve device 182 when the supply of coal in tank 20 is at a desired level. When the amount of coal in tank 20 is below the desired level, control pipe 267 is open to the control supply line 115 via the relay valve device 182 when positioned as it is shown in Fig. 2. If the plant is shut down, the tank 20 may be empty, and the control line 115 may be void of fluid under pressure, so that even though the control pipe 267 is shown open to the supply line 115 via relay valve device 182 in Fig. 2 in the drawing, chamber 272 in the timing cylinder device 183 will not be pressurized and consequently, the piston 271 will be in its rest position under such a condition. As soon as the plant is brought into operation and the control supply line 115 pressurized, piston 271 will then move in the direction of chamber 273 to close off to atmosphere and effect supply of fluid under pressure to pipes 280, 281, 282.

The switch device 184 may comprise a casing having a bore formed therein closed at opposite ends by end walls 288, 289, respectively. A piston 290 is slidably disposed in the bore, subject to pressure of fluid in an atmospheric chamber 291 at its one side and pressure of fluid in a chamber 292 at its opposite side. A compression return spring 293 is disposed in chamber 291, arranged to urge piston 290 in the direction of chamber 292 toward a normal rest position seated against a rib attached to end wall 289, in which position it is shown in the drawing. A rod 294 operatively connects the piston 290 to an electrical switch element 295 of electrical conducting material. Rod 294 is secured at its one end to piston 290 and extends through chamber 291 and an opening in end wall 288. The switch element 295 may be attached to the rod 294 at its outer projecting end. Two electrical contact elements 296, 297, insulated electrically one from the other, are secured to a member 298 attached to the casing and disposed in the path of travel of the switch element 295 carried by rod 294. In response to supply of fluid under pressure to chamber 292, the piston 290 will be caused to bring switch element 295 into contact with both contact elements 296, 297, to complete an electrical circuit connected to motors 7, 12, 22. A wire 299 may connect the contact element 296 to one pole of a source of electrical energy, such as a battery 300. The opposite pole of the battery 300 may be connected, via a wire 301 and its branches, to one pole of the suction fan motor 12, crusher motor 7, and coal pump motors 22, while the remaining respective poles of these motors are connected, via a wire 302 and its branches, to the contact element 297 of switch device 184. The switch device 184, therefore, connected in series with a source of electrical energy, makes and breaks a cicruit for controlling operation of the above-mentioned motors. When pipe 280, and thereby chamber 292, are vented to atmosphere via timing cylinder device 183, said switch device is in an open position in which the electrical circuit to the motors is broken.

Referring to Fig. 8, the interlock valve device 188 associated with the discharge duct 15 of the suction fan 11 may comprise a casing 305 secured to the outside of said duct. The casing may have formed therein a supply chamber 306, a delivery chamber 307, and a cavity 308; chambers 306, 307 being separated by a partition 309, and chamber 307 from cavity 308 by a partition 310. A branch of the control supply line 115 may be connected to the supply chamber 306 for supplying fluid under pressure thereto. A supply valve 311 contained in chamber 306 is provided for controlling supply of fluid under pressure from said chamber to delivery chamber 307 via a bore 312 extending through the partition 309. A bias compression spring 313 disposed in chamber 306 is arranged to urge the valve 311 toward a seat 314 formed in partition 309 at one end of bore 312. A fluted stem 315 is slidably disposed in the bore 312 and attached to valve 311 for guiding same. Stem 315 extends through the bore 312 and projects into the delivery chamber 307. A release valve 316, in the shape of an inverted cone, as viewed in the drawing, is attached to the projecting end of the fluted stem 315 for cooperation with a release valve seat 317 formed in the end of a hollow release valve seat element 318 projecting oppositely into chamber 307. The seat element 318 extends through a bore 319 in partition 310 into cavity 308 and is operably connected to a diaphragm 320. Diaphragm 320 divides the interior of cavity 308 into two chambers, a chamber 321 defined by partition 310, and a chamber 322 defined by a wall of duct 15. Diaphragm 320 is subject opposingly to atmospheric pressure in chamber 321 open to atmosphere via a port 324, and to pressure of fluid in chamber 322, which is constantly open to the interior of the duct 15 via a port 325. A light compression control spring 326 is disposed in chamber 321, arranged to urge the diaphragm 320 toward a rest position seated against projecting ribs attached to the casing and disposed in chamber 322. In rest position of the diaphragm, the release valve seat element 318 attached thereto will be disposed away from the release valve 316, so that chamber 307 will then be open to the atmosphere via a central passage 327 in element 318, chamber 321, and exhaust port 324. One end of passage 327 opens into the projecting end of element 318 encircled by the seat 317 formed therein, while the opposite end of said passage opens into the chamber 321 via ports 327' formed in said element. The delivery chamber 307 is constantly open to a control pipe 328 which is connected to the relay valve device 189.

Assuming that the suction fan 11 is not in operation, the pressure of fluid in the discharge duct 15 therefrom will be atmospheric pressure. Pressure of fluid in the chamber 322 in the interlock device 188 will also be atmospheric pressure and diaphragm 320 will be disposed in its rest position, with release valve 316 unseated and supply valve 311 seated, in which position they are shown in the drawing. Chamber 306 will be closed to chamber 307, which latter chamber will be open to atmosphere via chamber 321. Pipe 328 connected to relay valve device 189, therefore, will be open to atmosphere.

Once the suction fan 11 is operating, the pressure of fluid in the discharge duct 15 therefrom will be above atmospheric pressure and this pressure, reflected in chamber 322 in the interlock valve device 188 will deflect the diaphragm 320 in the direction of chamber 321 against action of spring 326. This deflection of the diaphragm 320 will cause the element 318 to engage the release valve 316, thus closing off chamber 307 from chamber 321, and to then unseat the supply valve 311 against action of spring 313, thus opening chamber 306 to said chamber 307. Fluid under pressure supplied to chamber 306 from pipe 115 will then flow via chamber 307 to the pipe 328 connected to the relay valve device 189. Once the fan 11 is shut down, the interlock valve device will again assume its rest position, in which it is shown in the drawing, by action of springs 313 and 326.

The relay valve devices 185, 186, 187 and 189 may be constructed substantially the same as the relay valve device 182, as previously described, and for this reason detailed description thereof will not be repeated, but identical parts will be referred to by the same reference numerals.

The control pipe 328 from interlock valve device 188 is connected to the diaphragm chamber 245 in the relay valve device 189 for controlling operation of the respective valves 254, 259. In the relay valve device 189, in absence of fluid under pressure in diaphragm chamber 245, the valve 254 will be closed, with valve 259 open. Conversely, with fluid under pressure in chamber 245, valve 254 will be open and valve 259 closed. Delivery chamber 249 is connected to a control pipe 329 which is in turn connected to the diaphragm chambers 245 of the relay valve devices 185 and 186. The chamber 248 in relay valve device 189 is connected to atmosphere via pipe 330, and chamber 250 is connected to a supply pipe 331. Supply pipe 331 is adapted to be supplied with fluid under pressure from the magnet valve device 191.

When pipe 328 is non-pressurized, the relay valve device 189 closes pipe 331 to pipe 329, and when said pipe 328 is pressurized, said pipe 331 is opened to said pipe 329.

Magnet valve device 191 may be of a well-known type comprising a magnet portion 332 shown in outline, and a valve portion shown substantially in cross-section. The valve portion may be provided in the usual manner with a supply chamber 333, delivery chamber 334, and exhaust chamber 335. Supply chamber 333 may be connected to a source of fluid under pressure, such as a branch of the control supply pipe 115, to furnish fluid under pressure thereto, the delivery chamber 334 may be connected to a pipe, such as the supply pipe 331 leading to relay valve device 189, and exhaust chamber 335 may be connected to the atmosphere via a pipe 336. A normally closed supply valve 337 disposed in chamber 333 is provided for controlling communication between the supply chamber 333 and the delivery chamber 334. A normally open release valve 338 in chamber 335 controls communication between the delivery chamber 334 and the exhaust chamber 335. A bias spring disposed in the supply chamber 333 is arranged to urge the supply valve 337 toward its closed position and at the same time urge the release valve 338 toward an open position, in which position the two valves are shown in the drawing. One terminal 340 of the magnet portion 332 of magnet valve device 191 may be connected to ground, while its other terminal 341 may be connected by means of a wire 342, to one pole of the generator device 190 driven by the crusher motor 7, the other pole of device 190 being connected to ground.

With the crusher motor 7 idle, the magnet portion of magnet valve device 191 will be deenergized. The device 191 is so constructed and arranged that upon energization of magnet portion 332, the release valve 338 is caused to close and the supply valve 337 to open. It will be seen therefore that the supply pipe 331 to the relay valve device 189 is open to atmosphere via the magnet valve device 191 when deenergized, and when energized, said supply pipe 331 is connected via device 191 to the control supply pipe 115. The pipes 281 and 282 from the timing cylinder device 183 are connected respectively to the chamber 250 in the relay valve devices 185 and 186. The delivery chamber 249 in relay valve device 185 is connected by way of a pipe 343 to the crusher gate operating cylinder 6'. The delivery chamber 249 of relay valve device 186 is connected by way of a pipe 344 to the diaphragm chamber 245 of the relay valve device 187. The chambers 248 in the relay valve devices 185, 186 are connected to atmosphere via respective pipes 330.

In relay valve device 187 the delivery chamber 249 is connected by way of a pipe 345 and check valve 346 to the air operated stoker motor 3. Chamber 250 is connected by way of a pipe 347 to discharge pipe 91 from the compressor 68 ahead of the cooling coils 92 to furnish supply of fluid under pressure to the pipe 345 for operating the motor 3; and chamber 246 is open to atmosphere via a respective pipe 330.

Relay valve devices 185, 186, 187 each operates similarly to relay valve device 189. In each of these relay valve devices, when the diaphragm chamber 245 is at atmospheric pressure, the valve 254 is closed and the valve 259 open so that a pipe connected to chamber 249 will be open to the atmosphere via the open valve 259, chamber 248 and the pipe 330. Upon supply of fluid under pressure to diaphragm chamber 245, the valve 259 is caused to close and the valve 254 to open and therefore a pipe connected to chamber 250 will be open via the unseated valve 254 and chamber 249 to a pipe connected thereto.

When fluid under pressure is supplied simultaneously to the respective diaphragm chamber 245 in relay valve devices 185, 186, it will be seen that pipe 281 is connected via relay valve device 185 to pipe 343 for supplying fluid under pressure to the crusher gate operating cylinder 6', and that pipe 282 is connected via the relay valve device 186 to pipe 344 for supplying fluid under pressure to the diaphragm chamber 245 of relay valve device 187. Relay valve device 187 then responds to connect pipe 347 to pipe 345 for supplying fluid under pressure to the stoker motor 3 for operating same.

It will now be seen that until the suction fan 11 is operating to remove crushed coal from crusher 5, and until said crusher is operating at full speed to be able to properly handle any coal supplied thereto, the crusher gate 6' and the stoker motor 3 are rendered inoperative. Once the suction fan 11 and crusher 5 are brought into operation, automatically, the crusher gate 6 is opened and the stoker motor 3 started.

When fluid under pressure is subsequently vented from the chamber 272 in the timing cylinder device 183, as when the proper level of coal in tank 20 has been reestablished, the pipes 282, 281, 280 are consecutively opened to chamber 273 and atmosphere by movement of piston 271, in the order named. Consequently, first the diaphragm chamber 245 in the relay valve device 187 is vented to atmosphere via pipe 344, relay valve device 186 and the pipe 282 to cut off supply of fluid under pressure to the stoker motor 3; then the pipe 343 is vented to atmosphere via the relay valve device 185 and pipe 281 to allow the cylinder 6' to effect closure of the crusher gate 6; and finally the chamber 292 in the switch device 184 is vented to atmosphere via pipe 280 to allow said switch device to return to its open position in which it is shown in the drawing to again cut off supply of electric current to the suction fan motor 12, crusher motor 7 and coal pump motors 21.

It is desirable to be able to supply compressed air to the stoker motor 3 at a higher pressure than that supplied from compressor 68 in the event that the stoker 2, driven by said motor, becomes stalled, due to jamming of coal or the like, in order to better attempt to free the stoker. This is accomplished by means of a relay valve device 348, substantially similar schematically to the other relay valve devices previously described but of greater capacity, and which is adapted to respond to dictates of an operator's valve device 349 to effect supply of fluid at a higher pressure, about one hundred and fifty pounds for example, from the reservoir 94 by way of a pipe 350, to the stoker motor 3.

For details of relay valve device 348, reference may be made to relay valve device 182. In the relay valve device 348 pipe 350 is connected to the chamber 250. A pipe 351 connects the delivery chamber 249 to the pipe 345 leading to the stoker motor 3 for supplying fluid under pressure thereto. A check valve 346 in pipe 347 prevents flow of fluid at the higher pressure thus supplied to pipe 345 via pipe 351 from flowing into relay valve device 187. The diaphragm chamber 245 of relay valve device 348 is connected to a control pipe 352 which is normally open to atmosphere, as will be described hereinafter, so that said chamber is also so open, and valve 254 normally is closed and valve 259 normally open, as will be obvious from previous description. The delivery chamber 249, therefore, normally is open to atmosphere, and a check valve 353 is provided in pipe 251 to prevent any fluid under pressure supplied to pipe 345 from relay valve device 187 from flowing to atmosphere via relay valve device 348.

The control pipe 352 is connected to a delivery chamber 354 provided in the operator's control device 349. Device 349 is also provided with a supply chamber 355 adapted to be supplied with fluid under pressure from a branch of supply pipe 115 connected thereto, and an exhaust chamber 356 which is open to the atmosphere via a port 357. Chambers 354 and 355 may be separated one from the other by a partition 358, while a partition 359 separates said chamber 354 from chamber 356. A supply valve 360, disposed in chamber 355, is provided for controlling communication between said chamber 355 and the chamber 354. Valve 360 may be attached to a fluted stem 361 slidably disposed in a bore extending through partition 358. A bias spring 363 is arranged to urge the valve 360 toward a normally closed position, in which position it is shown in the drawing. Stem 361 projects into the delivery chamber 354, and a release valve 364 is attached to the end thereof. A release valve seat element 365 in the form of a hollow member is slidably disposed in a bore extending through the partition 359. Seat element 365 is provided with a central passage 367 which extends from the projecting end of said element disposed in chamber 354 to ports 368 opening into the exhaust chamber 356. A release valve seat is formed in the projecting end of element 365 encircling the opening of passage 367 for engagement with the release valve 364. Element 365 is associated with a push button element 369, which is adapted to be operated manually for advancing seat element 365 in the direction of the release valve 364 for contact therewith to close delivery chamber 354 to exhaust chamber 356 via passage 367, and to then effect unseating of the supply valve 360. Push button element 369 is urged, by action of a spring 370, toward a normal rest position in which seat element 365 is disposed away from the release valve 364, in which position it is shown in the drawing. Normally, therefore, the control pipe 352 is open to the atmosphere via the delivery chamber 354, pasage 367 in element 365, ports 368, chamber 356 and port 357.

A stoker reversing air motor 371 is provided for reversing direction of rotation of stoker 2 in event of a jam which might not otherwise be freed. Device 371 may be operatively connected through gears to a projecting portion of a shaft 373 attached to the stoker.

Operation of the stoker reversing air motor 371 may be controlled by an operator's valve device 374 similar to valve device 349, and for description of parts of device 374, therefore, reference may be made to device 349. The delivery chamber 354 of device 374 may be connected to a pipe 375 in turn connected to the cylinder device 371. The supply chamber 355 of device 374 may be connected to a branch of the control supply line 115 to furnish fluid under pressure for supply thereto. In a manner similar to that previously described in regard to device 349, the device 374 will normally open pipe 375 to atmosphere, and by manual operation of its push button element 369, will effect supply of fluid under pressure from line 115 to pipe 375 for operating the reversing motor 371.

*General description of controls for the turbo-electric portion of the plant*

A fluid pressure actuator device 376 is provided for positioning the coal feed regulator device 26, and a similar fluid pressure actuator device 377 is provided for positioning the adjustable nozzle device 43. Both actuator devices 376, 377 are adjustable in accordance with variations in pressure of fluid in a control line 378 common to both devices for simultaneous positioning of devices 26 and 43.

Variations in pressure of fluid in the control line 378 are effected by adjustment of a self-lapping valve device 379 which is similar to the self-lapping valve device 201.

Adjustment of the self-lapping valve device 379 is effected by a cam and lever arrangement 380, which is positioned in accordance with the speed setting of a governor device 381.

The speed setting of the governor device 381 is effected by a fluid pressure actuator device 382 in accordance with variations in pressure of fluid in a branch pipe 383 of a control line 384. A check and choke valve device 385 and a volume chamber 385' are inserted in the branch pipe 383 for allowing rapid flow of fluid under pressure to the actuator device 382 and slow return of said fluid under pressure therefrom.

Variations in pressure of fluid in the control line 384 are effected by adjustment of a self-lapping valve device 386, similar to device 201, which is comprised in an operator's controller device 387. A rotatable cam 388 is provided in the device 387 which is adapted to be positioned by an operator's handle 389 for effecting adjustment of the self-lapping valve device 386.

A high temperature interlock 390 is interposed between the self-lapping valve device 379 and the actuator devices 376, 377 for preventing additional fuel from being supplied to the combustion chamber 58 when temperature of hot gases in the inlet to the turbine 45 exceeds a certain value. Interlock 390 comprises a self-lapping valve device 391 which is adjustable to control the degree of pressure of fluid allowed to reach devices 376, 377 from the device 379, and a temperature sensitive actuator device 392 for adjusting said self-lapping valve device 391 in accordance with variations in the temperature in the duct 79 connected to the turbine inlet.

The arm 90 of the rheostat 88, for controlling flow of electric current to the field of generator 83, is arranged to be positioned by a fluid pressure actuator device 393 in accordance with variations in pressure of fluid from a self-lapping valve device 395 arranged to be adjusted by the cam and rocker arrangement 380.

A choke and check valve 396 and volume chamber 391' are inserted in the communication between the devices 395 and 393 which allow slow supply of fluid under pressure to the actuator device 393 and its quick release therefrom.

An interlock in the form of a magnet valve device 398 is also interposed between devices 393, 395 to prevent supply of fluid under pressure to the actuator device 393 when the operator's handle 389 of controller device 387 is in an idle position, for reasons which will become obvious hereinafter.

A low temperature interlock arrangement 401 is provided for preventing a change in the speed setting of the governor device 381 from an idling speed setting unless temperature at the inlet to the turbine is above a predetermined minimum value. The low temperature interlock arrangement 401 comprises a self-lapping valve device 402 which is adjustable to control pressure of fluid to the actuator device 382 for biasing effect of pressure of fluid supplied via branch pipe 383 thereto. For adjusting the self-lapping valve device 402, a temperature sensitive actuator device 403 is provided in the interlock arrangement.

A magnet valve device 404 is provided which is arranged to render the low temperature interlock arrangement 401 ineffective to influence the actuator device 382 when the driving motor 86 is disconnected from the generator 83. This enables an operator to regulate the speed setting of governor device 381 through its entire range for testing and warming up of the turbine 45 without interference from the low-temperature interlock arrangement, as will be pointed out hereinafter.

The operator's controller device 387 further comprises a second operator's handle 399 arranged to operate an electric switch for connecting and disconnecting terminals of the driving motor 86 from terminals of the generator to start and stop said motor and for reversing the polarity of the motor field terminals to effect reversing of the direction of rotation of said motor and thereby the direction of motion of the locomotive.

For adjusting position of the needle valve 67a of nozzle device 67 to control supply of fuel oil to the combustion chamber 58, a fluid pressure actuator device 405 is provided. An operator's control valve device 406 is provided for controlling supply of fluid under pressure from a source independent of the control supply line 115 to the actuator device 405. A relay valve device 407, responsive to pressure of fluid from the operator's control valve device 406, is operable to effect supply of fluid under pressure to the by-pass valve device 55 and to a normally closed fluid pressure switch device 408 for stopping stoker motor 25 to prevent coal from being fed into the combustion chamber 58 via feed pipe 27 during warm-up with fuel oil, as will be described hereinafter. A magnet valve device 409 is provided for controlling supply of fluid under pressure to the operator's control valve device 406.

A starting switch 410 is provided for controlling supply of electric current from a source such as the battery 300 to the magnet valve device 409, and the various electric motors in the plant, as will be described hereinafter in detail.

Detailed description of controls for turbo-electric portion of plant

The fluid pressure actuator device 376 may comprise a hollow cylindrical casing 412 containing a piston 413 slidably mounted therein which is subject to pressure of fluid in a chamber 415 at its one side and to pressure of fluid in a chamber 416 at its opposite side. Chamber 415 is open to a port 417 in the casing, which, in the present instance, is open to the atmosphere. A compression control spring 419 is disposed in chamber 415 and arranged to urge the piston 413 in the direction of chamber 416 toward a rest position seated against a projecting portion of an end wall 420' secured to the casing. A piston rod 420 is attached at its one end to the piston 413 for movement therewith, and at its opposite projecting end outside the casing is pivotally connected to an operating lever 421 for positioning same. An opening in the casing accommodates the rod 420 which is slidable therein.

The operating lever 421 is pivotally connected at its one end by a pin 424 to a projecting arm 425 attached to casing 412. The opposite end of lever 421 is provided with a slot 426 to accommodate a pin or the like for operative connection to a device or element to be position.

The operating lever 421 of actuator device 376 is operatively connected to stem 34 of the coal feed regulator device 26, while lever 421 of the actuator 377, which is similar to device 376, is operatively connected to the rod 53 of the adjustable nozzle device 43. The respective chamber 416 of both actuator devices 376, 377 is connected to the control line 378 which is common to both of said devices.

In both the actuator devices 376, 377, upon supply of fluid under pressure to the chamber 416 therein, the piston 413 will move in the direction of chamber 415 against action of spring 419, and through rod 420 attached to said piston, will adjust position of lever 421 according to degree of movement of the piston. Piston 413 will move in the direction of chamber 415 until the fluid pressure force on its one side balances the force of spring 419 on its opposite side, and this in turn will depend on the degree of pressure of the fluid supplied to the chamber 416. Upon subsequent reduction in pressure of fluid in the chamber 416, the piston will move in the direction of said chamber by action of spring 419 a distance dependent upon the degree of said reduction, with a resultant re-positioning of the lever 421. It will thus be seen that lever 421 will be caused to assume an angular position closer to or further away from the casing of the actuator device in accord with the degree of pressure of the fluid in the chamber 416.

Variations in pressure of fluid effected via the control pipe 378 simultaneously in the respective chambers 416 in both devices 376, 377 effects simultaneous adjustment of the position of the respective levers 421. As fluid under pressure in chamber 416 in actuator device 376 is increased, through consequent positioning of the operating stem 34 attached to lever 421, the valves 29 and 30 in the coal feed regulator device 26 are positioned to increase the amount of coal supplied to the feed line 27 and reduce the amount of coal returned to the tank 20. As the pressure of fluid in the chamber 416 of the actuator device 376 is decreased, through the lever 421 and stem 34 the valves 29 and 30 are positioned correspondingly to decrease the amount of coal to the feed line 27, and hence the combustion chamber 58 and return the balance to the tank 20. The amount of coal supplied to the feed line 27, is thus varied in accordance with pressure of fluid in the control line 378, increasing as pressure of fluid in said line is increased and decreasing as pressure of fluid in said line is decreased.

In similar manner, increase in pressure of fluid in the chamber 416 of device 377, through lever 421, positions rod 53 and adjustable element 51 in nozzle device 43 to increase the flow area at the throat. Decrease in pressure of fluid in chamber 416 in actuator device 377 causes adjustment of rod 53 and adjustable element 51 in nozzle device 43 to decrease the throat area of said nozzle device. An increase in coal and and air supply to the fuel line 27 calls for an increased throat area in the adjustable nozzle device 43, while a decrease in coal and air in fuel line 27 calls for a decrease in said throat area, in order to maintain the proper pressure drop through said nozzle device. For this reason, the coal feed regulator device 26 and the adjustable nozzle device 43 are positioned simultaneously in accordance with variations in pressure of fluid in the control line 378.

The self-lapping valve device 379 for effecting variations in pressure of fluid in line 378' and the self-lapping valve device 390 for effecting variations in pressure in line 378 are substantially similar to the self-lapping valve device 201 hereinbefore described in detail, in view of which a detailed description of the devices 379 and 390 will not be given herein.

As will hereinafter be described in detail, the pressure of fluid in control line 384 is varied from a maximum pressure of sixty pounds to a minimum pressure of ten pounds, for example, so that the maximum pressure that may be delivered to line 378' by device 379 is limited to that present in pipe 384.

The control line 378 connected to the actuator devices 376, 377 is connected in turn to the delivery chamber 204 of the self-lapping valve device 391, while the supply chamber 203 of said device 391 is connected via a pipe 378' to the delivery chamber 204 of the self-lapping valve device 379. A branch of the control line 384 is connected to the supply chamber 203 of the valve device 379 as a source of supply of fluid under pressure therefor.

The cam and rocker arrangement 380 may comprise two oppositely extending arms 427, 428 adapted to rock about a pin 429 secured to a fixed projecting member 430. To the outer projecting end of arm 427 a cam element 435 is secured for engagement by a roller follower 434 carried by the stem 200 of the self-lapping valve device 379. Similarly, to the outer projecting end of the arm 428 a cam element 436 is attached for engagement by a similar roller follower 434 of the self-lapping valve device 395. A third arm 437 is attached at its one end to the arms 427, 428 while its opposite end carries a pin 438 adapted to ride in a slot formed in one end of a rockable actuating link 439. Link 439 is pivotally connected at 440 to a fixed element 441 and serves to connect the governor device 381 to the cam and lever arrangement 380.

As will hereinafter be described, the self-lapping valve device 391 is usually so positioned by the high temperature responsive device 392 that the supply valve seat element 206 in said device 391 is disposed away from the supply valve 210 a sufficient distance that any variations in pressure of fluid effected in the line 378' are effected in the line 378 via cavity 208, the unseated valve 210 and chamber 204 in said device 391. Only until the temperature at the inlet to the turbine tends to become excessive, such as 1300° F., for example, does the temperature responsive device 392 respond to adjust position of seat element 206 through stem 200 in the self-lapping valve device 391 in such a manner as to limit the pressure of fluid in line 378 to a value below that in line 378'.

The cam element 435 in cam and lever arrangement 380 is so shaped that by engagement with roller 434 on stem 200 of the self-lapping valve device 379, as the arm 427 is rocked in a clockwise direction about pin 429, said stem 200 is caused to move inwardly of the casing of said valve device to effect an increase in pressure of fluid in the line 378' in accordance with position of said stem, as will be understood from the previous description of the self-lapping valve device 201. As the arm 427 is rocked in a counterclockwise direction about pin 429, the stem 200 of the self-lapping valve device 379 is allowed to move outwardly for effecting a reduction in pressure of fluid in the line 378' in accordance with position of said stem.

The self-lapping valve device 395 is also similar to the self-lapping valve device 201 previously described. The supply chamber 203 of device 395 is connected to a branch of the control supply line 115, while the delivery chamber 204 thereof is connected by way of a pipe to the supply chamber 333 of the magnet valve device 398, which is similar to the magnet valve device 191 previously described. The delivery chamber 334 of the magnet valve device 398 is connected by way of a pipe 441'', the volume chamber 391', and choke and check valve device 396 to the chamber 416 of the actuator device 393 which is also similar to the actuator device 376 previously described.

The shape of the cam 436 of the cam and lever arrangement 380 is such that by its movement with lever 428 in a counterclockwise direction about pin 429 inward movement of stem 200 of the self-lapping valve device 395 is caused for effecting an increase in pressure of fluid in the pipe 441', and by turning movement of cam 436 in the opposite direction said stem is allowed to move outwardly for effecting a decrease in pressure of fluid in said pipe 441'.

When the magnet valve device 398 is energized, as will be explained hereinafter, the pipe 441' is connected to the pipe 441'', and any variation in pressure of fluid in the pipe 441' effected by the self-lapping valve device 395 is also effected in the pipe 441''. Variations in pressure of fluid in pipe 441'' are transmitted to the pressure chamber 416 of the actuator device 393 via the volume chamber 391 and the choke and check valve device 396 which prevents a rapid build-up in pressure of fluid in said chamber 416 but allows a rapid reduction in pressure in said chamber. In the actuator 393, as pressure of fluid in chamber 416 is increased above atmospheric pressure, the piston 413 will move from its rest position, in which it is shown in the drawing, to some position in the direction of chamber 415 in accord with the pressure in chamber 416 for effecting movement of the arm 90 of rheostat 88 from a position of maximum resistance to a position for reducing the resistance in the generator field circuit, so that the field current to the generator 83 is increased. Conversely, as pressure of fluid in the chamber 416 is decreased, the actuator device 393 responds to move arm 90 of rheostat 88 to increase the resistance in the field circuit for decreasing the current to the field of the generator 83.

The governor device 381 may comprise a rotatable governor head 442 adapted to be revolved by the main shaft $x$ of the turbine 45 through gears 443. The head 442 pivotally carries two oppositely arranged bell cranks 444 having governor weights 444' at their outer ends, while their adjacent inner ends engage a collar 445 secured to a longitudinally movable adjusting rod 446. A governor control spring 447 acts against rod 446 in opposition to centrifugal action of bell cranks 444 upon rotation of the head 442 by the shaft $x$. A bell crank 448, pivoted at its knee on a pin 449, is operable upon turning movement in a clockwise direction about said pin to increase the pressure of spring 447, and upon turning movement in the opposite direction, to reduce the pressure of said spring. The bell crank 448 is operably connected through a link 450 to the operating lever 421 of the fluid pressure actuator device 382.

The adjusting rod 446 is provided with an operating pin 451 disposed in a groove formed in the end of the link 439 so that axial movement of said rod, through resultant rocking movement of said link about its connection at 440, will cause a turning movement of the cam and lever arrangement 380 about pin 429.

By adjustment of the compression of spring 447 the speed setting of the governor device 381 is changed. An increase in the compression of the spring 447 calls for an increased speed of the turbine 45 while a decrease in the compression of spring 447 calls for a corresponding decrease in turbine speed.

For example, assume that the compression of the spring 447 is increased while the turbine 45 is running at a certain speed. The increased compression of the spring 447 will effect longitudinal movement of the rod 446 in a downward direction, as viewed in the drawing, since the centrifugal force acting on the underside of collar 445 caused by rotation of the governor weights 444' no longer balances with the increased force of spring 447 acting downwardly on rod 446. Through downward movement of the pin 451 carried by rod 446, the link 439 is rocked in a counterclockwise direction about pin 440. Counterclockwise turning movement of link 439, through pin 438, causes clockwise turning movement of the arms 427, 428 of cam and lever arrangement 380 about pin 429. As will be understood from previous description, clockwise turning movement of arms 427, 428 about pin 429 will condition the self-lapping valve devices 379, 395 to, respectively, effect an increase in pressure of fluid in the pipe 378' and a decrease in pressure of fluid in the pipe 441'. If the temperature at the inlet to the turbine 45 in duct 79 is not excessive, the increase in pressure of fluid in pipe 378' is communicated to pipe 378 via self-lapping valve device 391 and thence to the chambers 416 of the actuator devices 376, 377 which respond to adjust the coal feed regulator device 26 and adjust nozzle device 43 to call for more coal to be supplied to the fuel line 27 to the combustion chamber 58, thus tending to increase speed of the turbine. If the magnet valve device 398 is energized, as is the case when the driving motor 86 is connected to the generator 83, the decrease in pressure of fluid in pipe 441' will be communicated to the pipe 441", and by way of volume chamber 391 and choke and check valve device 396, to chamber 416 of the actuator device 383 which will respond to position arm 90 in the rheostat 88 to cut in more resistance for reducing current to the generator exciter windings 89. Reduction in current to generator exciter windings 89 will also tend to increase speed of the turbine.

As speed of the turbine increases, under influence of additional fuel supplied thereto and a reduction in excitation of the generator 83, rotation of the governor head 442 in the governor device 381, will increase with an increase in turbine speed and cause the governor weights 444' carried by said head to exert a greater upward force on the collar 445 secured to rod 446. When the upward force on collar 445 is thus increased sufficiently to balance the downwardly acting force of spring 447 on rod 446, further downward movement of said rod will cease. Through link 439, the cam and lever arrangement 380 is then held in its adjusted position commensurate with the new operating speed.

Now assume that the compression of the spring 447 is subsequently decreased. In manner similar to the above described effect of an increase in compression of the spring 447, but conversely, the decrease in compression of said spring creates an unbalance in longitudinal forces on rod 446 in governor device 381 in favor of the upward force exerted on collar 445 by rotation of weights 444' so that rod 446 will now move upwardly, and through link 439, cause counterclockwise turning movement of the cam and lever arrangement 380 about pin 429. The effect of such movement of cam and lever arrangement 380, as will be understood from previous description, is to so adjust the self-lapping valve devices 379, 395 to decrease pressure of fluid in pipe 378' and increase pressure of fluid in pipe 441' to effect through actuator devices 376, 393 a simultaneous decrease in the amount of coal supply to the feed line 27 from the coal feed regulator device 26 and an increase in the excitation current supplied to the generator 83 by readjustment of the position of the rheostat arm 90. The speed of the turbine 45 is thus decreased, and upon establishment of an equilibrium between downward force of spring 447 and upward force on collar 445 by rotating weights 444' in the governor device 381, further movement of cam and lever arrangement 380 is terminated, and the coal supply to the feed line 27 as well as the excitation of the generator 83 established for the new speed condition as dictated by the compression of said spring 447.

Assume that the driving motor 86 is being operated by output from the generator 83 and that the load on said motor is suddenly increased. Such an increase in load on motor 86 will be reflected in generator 83, hence turbine 45, by a corresponding increase in load. The tendency will be for the turbine 45 to slow down. The rod 446, in seeking a position to reestablish equilibrium of forces acting thereon will effect positioning of the cam and lever arrangement 380 simultaneously to effect increase in the supply of coal to feed line 27 and reduction in excitation of generator 83, as will be obvious from the previous description, to maintain the speed of the turbine constant and in accord with the speed setting of the governor device 381.

Conversely, if load on the motor 86 decreases, in like manner, the governor device 381 will respond to reposition the cam and lever arrangement 380 to effect, through self-lapping valve devices 379, 395 and actuator devices 376, 393, simultaneously, a reduction in supply of coal to the feed line 27 and an increase in excitation of the generator 83, to maintain speed of the turbine in accord with the speed setting of the governor device 381 and the reduced load.

It will be appreciated that since position of handle 389 determines the pressure of fluid in control line 384 and this in turn determines the speed setting of the governor device 381 as well as the maximum pressure which may be attainable in the pipes 378', 378 by adjustment of self-lapping valve device 379, said position of handle 389 determines the operating speed of the turbine 45 as well as the maximum amount of fuel that can be supplied thereto and hence its maximum power output for the particular position of handle 389. Therefore, it should be pointed out that while self-lapping valve devices 379, 395 are simultaneously adjusted by governor device 381 to call for increased fuel and decreased excitation when there is a tendency for shaft $x$ to slow down, such tendency may be of a proportion that further adjustment of self-lapping valve device 379 exceeds the limitation of pressure of fluid in line 384 and is therefore ineffective to increase supply of fuel, so that any additional compensation of shaft speed will be effected by said decreased excitation alone. For this reason, there is no direct relationship between the operating speed of the driving motor 86, hence speed of the locomotive, and the speed setting of the governor device 381 as determined by position of the handle 389 in the operator's controller device 381.

The volume reservoir 391' and the choke and check valve device 396 in the pipe 441", interposed between the magnet valve device 398 and the actuator device 393, prevents a sudden increase in field excitation of the generator 83 by restricting rate of supply of fluid under pressure to said actuator. A sudden increase in excitation of generator 83 would tend to effect a too rapid reduction in speed of the turbine for safe operation. The choke and check valve device 396 may be like the choke and check valve device 385.

The temperature sensitive actuator devices 392 and 403, may comprise (Fig. 9) a tubular member 460 of low thermal co-efficient of expansion secured adjacent its one end peripherally by means of welds or the like to a rigid element 461 adapted to be mounted on the outer surface of the duct 79 in such a manner as to dispose said tubular member substantially into said duct. A bore or opening 462 is provided in the wall of duct 79 to accommodate the tubular member 460 which projects therethrough. To the outer projecting end of the tubular member 460 an element 463 is secured, and a projecting finger 464 attached to said element carries a pin 465 for rockably carrying an actuating element 466. One end of the actuating element 466, at one side of pin 465, is adapted for engagement with the roller follower 434 of the self-lapping valve device 391 or 402 and is arranged in such a manner that rocking movement of element 466 in a clockwise direction about pin 465, as viewed in the drawing, will allow the stem 200 of said device 391 or 402, to move outwardly to decrease its delivery pressure. Conversely, rocking movement of element 466 in the opposite direction will cause stem 200 of device 391, or 402 to move inwardly, effecting an increase in its delivery pressure. A compression bias spring 467 is interposed between the rigid element 461 and the actuating element 466 at the follower side of the pin 465 and is so arranged as to urge said element 466 in a counterclockwise direction into engagement at the opposite side of said pin with one end of a rod 468 disposed substantially within the tubular member 460. The opposite end of rod 468 is secured to the projecting end of the tubular member 460 within the duct 79 by suitable means. The material of rod 468 has a high thermal coefficient of expansion, while material of member 460 has a low thermal coefficient of expansion so that upon increase in temperature within the duct 79 the rod 468 will expand more than the member 460 and cause the element 466 to rock in a clockwise direction about pin 465 against action of spring 467. Conversely, upon decrease in temperature in duct 79, rod 468 will contract and allow spring 467 to rock element 466 in a counterclockwise direction about pin 465.

As was hereinbefore mentioned, the high temperature interlock device 390 is provided for effecting a limitation of the amount of coal supplied to the combustion chamber 58 during operation of the plant when the temperature at the inlet to the turbine 45 approaches a maximum desirable limit, such as 1300° F.

The temperature at the turbine inlet, in the duct 79, for example, will depend upon the amount of fuel burned in the combustion chamber 58 and the amount and temperature of the air from compressor 68 mixed with the products of combustion generated by the burning of said fuel. The amount of air discharged from the compressor 68 and the amount of fuel supplied to the combustion chamber 58 will vary with operating conditions of the plant, speed and load, for example.

As the pressure of fluid in line 278 supplied to the actuator device 376 is varied from a minimum of ten pounds to a maximum of sixty pounds, for example, through adjustment of the coal feed regulator device 26, the coal supplied through the feed line 27 to the combustion chamber 58 is varied from a minimum to a maximum amount, respectively.

The temperature sensitive actuator device 392 in the high temperature interlock 390 is arranged to adjust position of the stem 200 of the self-lapping valve device 391 for varying the delivery pressure in the line 378 to reduce the amount of coal supplied to the combustion chamber 58 when the temperature at the inlet to the turbine 45 approaches a maximum desired limit.

Under different running conditions of the plant, pressure of fluid in the line 378' may be varied by the self-lapping valve device 379 from a minimum pressure of ten pounds to a maximum pressure of sixty pounds, for example. The compression of the control spring 220 and the position of stem 200 in self-lapping valve device 391 in engagement with actuating element 466 of temperature sensitive device 390 are initially so adjusted that when the temperature at inlet to the turbine 45 is less than 1250° F., for example, any variation in pressure of fluid in the line 378', between ten and sixty pounds, will also be effected in the actuator device 376 via line 378 for so adjusting position of the coal feed regulator device 36 to vary the coal supplied to the feed line 27 between a certain minimum amount, corresponding to the control pressure of ten pounds, and a certain maximum amount, corresponding to the sixty pound control pressure. As temperature of fluid in the duct 79 at the inlet to the turbine 45 increases, resultant rocking movement of the actuating element 466 of the temperature sensitive device 392 will allow the stem 200 of the self-lapping valve device 391 to move outwardly. The temperature sensitive device 392 and the self-lapping valve device 391 may be so adjusted that, with a pressure of fluid at sixty pounds in the line 378', as the temperature in duct 79 increases from 1250° F. to 1300° F., for example, said self-lapping valve device will respond to effect a graduated reduction in pressure of fluid in the line 378 from sixty to ten pounds, respectively. It will be seen, therefore, that under the assumed conditions, as the temperature in the inlet duct 79 tends to increase above 1250° F., the high temperature interlock 390 tends to reduce the pressure of fluid in line 378 to actuator device 376 and thereby so regulate the amount of coal supplied to the supply line 27, and thereby combustion chamber 58, that temperature in the duct 79 at the turbine inlet will not exceed the maximum desired limit of 1300° F., for example. At the same time, if the pressure of fluid in line 378' is sixty pounds, calling for a maximum supply of coal to the combustion chamber 58, and the temperature inlet in duct 79 is between 1300° F. and 1250° F., for example, should the temperature in said inlet duct tend to drop, the temperature sensitive device 392 will automatically respond to move stem 200 of the self-lapping valve device 391 inwardly for effecting an increase in pressure of fluid in line 378 to the actuator device 376 to call for more coal to feed line 27 to prevent such a reduction in inlet temperature.

As temperature in the inlet duct 79 to the turbine 45 is also dependent upon the working conditions of the plant, such as load and speed of the turbine, as well as the amount of fuel being burned in the combustion chamber 58, the amount of fuel supplied to feed line 27 at which the temperature in the inlet to the turbine might approach the maximum desired value will vary with said working conditions. Consequently, the pressure of fluid in line 378', which indirectly determines the maximum amount of coal which may be supplied to the feed line 27, will not be constant for any given temperature in the inlet duct 79. If, as was the previously chosen example, the interlock 390 is adjusted to graduate the pressure of fluid in line 378 from sixty to ten pounds as temperature varies from 1250° F. to 1300° F. when pressure of fluid in line 378' is at sixty pounds, then should the pressure in said line 378' be some lower value, such as thirty-five pounds, at the time that temperature in duct 79 approaches the maximum desired value, graduation of pressure of fluid in line 378' may then be effected between limits of thirty-five pounds and ten pounds corresponding to 1275° F. and 1300° F., respectively. The interlock 390 will operate in the same manner, however, to automatically effect regulation of the amount of coal supplied to the combustion chamber 58 to assure operation of the turbine at substantially a maximum desired value.

It will be seen that once the temperature to the inlet to the turbine 45 reaches substantially a maximum desired value that the high temperature interlock 390 will prevent an increase above said desired value and will tend to prevent a reduction below that value.

The fluid pressure actuator device 382 for adjusting the compression of spring 447, hence the speed setting, of governor device 381, is substantially similar to the fluid pressure actuator device 376 previously described. The chamber 416 of device 382 is connected to the control line 384 via pipe 383 so that pressure of fluid in said chamber will be varied with pressure in said control line. The chamber 415 in device 382, as was not the case in device 376, is not open to atmosphere but is adapted to be supplied with fluid under pressure by way of a pipe 470 connected to the delivery chamber 334 in the magnet valve device 404, which is similar to the magnet valve device 191. The supply chamber 250 in magnet valve device 404 is connected to the delivery chamber 204 of the self-lapping valve device 402 in the low temperature interlock 401 by way of a pipe 471. The supply chamber 203 of the self-lapping valve device 402, which is similar to self-lapping valve device 199, is connected to the control supply line 115 at a pressure of sixty pounds.

Magnet valve device 404 when deenergized opens the pipe 470, hence chamber 415 in device 382, to the atmosphere via its pipe 336. When energized, the magnet valve device 404 connects the pipe 470 to the pipe 471 from the low temperature interlock 401.

When chamber 415 in actuator device 382 is connected to atmosphere via magnet valve device 404, as pressure of fluid in the control line 384 is varied from ten to sixty pounds, corresponding to moving the operator's handle 389 in controller device 387 from an "idle" position to a "full power" position, the actuator device 382 will respond to adjust position of bell crank 448 for increasing compression of spring 447 in the governor device 381 from a minimum to a maximum value, corresponding to an "idling speed" setting to a "full speed" setting of said governor device.

The self-lapping valve device 386 in the controller 387 is similar to the self-lapping valve device 201. The supply chamber 203 of device 386 is connected to the control supply line 115 at sixty pounds pressure and the delivery chamber 204 of said device is connected to the control line 384. Cam 388 is so shaped as to adjust position of stem 200 of the self-lapping valve device 386 to effect variations in pressure of fluid in line 384 as said cam is turned with handle 389 from its "idle" to its "full power" position.

Choke and check valve device 385 is of a well-known type arranged to allow unrestricted transmission of fluid under pressure to the chamber 416 of actuator device 382 and to prevent a sudden release of fluid under pressure therefrom. A too sudden reduction in speed of turbine 45 is thereby prevented. Volume chamber 385' tends to smooth out flow of fluid under pressure through 383.

When magnet valve device 404 is energized, and therefore pipe 471 is connected to the pipe 470, fluid under pressure supplied by the self-lapping valve device 402 in the low temperature interlock 401 to the pipe 471 is transmitted to the chamber 415 in the actuator device 382 where it acts to oppose action of pressure of fluid in chamber 416 on the opposite side of piston 413 in said device 382 to prevent a change in the speed setting of the governor device 381 from "idling speed" until temperature at the inlet to the turbine 45 approaches a desired lower limit of 1200° F., for example.

The temperature sensitive actuator device 403 comprised in the low temperature interlock for adjusting position of the self-lapping valve device 402 is similar to the temperature sensitive actuator device 392 in the high temperature interlock 390. The self-lapping valve device 402 is so adjusted initially with respect to the temperature sensitive actuator device 403 that until a minimum temperature of 1200° F., for example, in the inlet duct 79 is reached, the pressure of fluid in the pipe 471 is maintained at full supply pressure, or sixty pounds, which is the pressure of fluid in the control supply line 115. With pipe 471 connected to pipe 470 via magnet valve device 404, therefore, the pressure of fluid at sixty pounds in the chamber 415 in the actuator device 382 will prevent any change in the speed setting of the governor device 381 from its idle speed setting, even though pressure of fluid in chamber 416 of said device 382 may also reach sixty pounds. As the temperature in the inlet duct 79 exceeds the minimum desirable operating temperature of 1200° F. and approaches some such value as 1250° F., the self-lapping valve device 402 is arranged to effect a graduated reduction in pressure of fluid in pipe 471 from sixty pounds to ten pounds. In so doing, with pipe 471 open to pipe 470, the restraining influence of pressure of fluid in chamber 415 on piston 413 in the actuator device 382 may be gradually reduced until pressure of fluid in the chamber 416 becomes effective to increase the speed setting of the governor device 381 above the idling setting. The bias on piston 413 in actuator device 382 created by pressure of fluid supplied to the chamber 415 is then gradually reduced from a maximum value to a minimum value as temperature at the inlet to the turbine is increased above 1200° F. and approaching 1250° F. Above 1250° F. at inlet to the turbine, the delivery pressure in pipe 471 will remain at a minimum of ten pounds or less to allow maximum effectiveness of pressure of fluid in the chamber 416 in actuator device 382 for increasing the speed setting of the governor device 381.

Upon subsequent reduction in temperature at the inlet to the turbine through the range between 1250° F. and 1200° F. the interlock 401 will effect a graduated increase in pressure in pipe 471 from a minimum value to a maximum value for increasing the bias on piston 413 in actuator device 382 for decreasing the speed setting of the governor device 381. Upon a decrease in temperature below the 1200° F., the maximum bias will be reestablished in the actuator device 382 and the governor device 381 returned to its idling speed setting.

Position of the operator's handle 389 in the operator's controller device 387 controls energization of the magnet valve device 398. One pole of a source of electrical energy such as a battery 475 is connected to a portion 476 of the operator's handle 389 which is insulated electrically from the handle proper. The opposite pole of battery 475 is connected to ground, while one pole of the magnet valve device 398 is grounded. A contact element 477, adapted and arranged for contact with the portion 476 of handle 389 when same is moved out of its "idle" position, is connected via a wire 478 to the opposite pole of the magnet valve device 398. When the operator's handle 389 is in its "idle" position, the magnet valve device 398 is energized thus venting pipe 441" to the atmosphere. When handle 389 is moved out of "idle" position toward "full power" position, the magnet valve device is energized and thus connecting pipes 441' and 441" to allow for adjustment of the rheostat 88 as previously described. Pipe 441" is vented to atmosphere when the handle 389 is in idle position to automatically assure positioning of the rheostat 88 for minimum field excitation when the turbine 45 is operating under idling conditions.

To control starting and stopping and reversing of the driving motor 86, a switch is provided on the operator's controller device 387 which for sake of illustration may comprise two spaced apart electrical contact elements 486 and 487 secured for rotary movement with the operator's handle 399 and insulated electrically one from the other. The element 486 may connect, by means of a wire 489, to one pole of the armature of motor 86, while the element 487 may be connected by a wire 495 to one pole of the generator 83, although same are not shown connected in the drawing for sake of simplicity. The opposite pole of the armature of motor 86 is constantly connected by means of a wire 496 to the opposite pole of the generator. Four spaced apart electrical contact elements 491, 492, 493, 494, secured to a fixed member and insulated one from the other, may be provided for contact with the movable elements 486, 487. Elements 491, 494 may be connected to one side of the field of motor 86 by a wire 497, while elements 492, 493 may be connected to the opposite side of said field by a wire 490. While these wires 489, 490, 495, 497 connected to the motor 86 and to generator 83 from the controller device 387, for sake of simplicity are not shown connected in the drawing, it will be understood that same is intended as described above. The elements 491, 492, 493, 494 are so arranged with respect to the elements 486, 487 that when the operator's handle 399 is in an "off" position as indicated by a dot and dash line so titled and in which it is shown in the drawing, the wires 489, 490 and 497 connected to the motor 86 are disconnected from the wire 495, connected to one pole of the generator 83 so that no current will flow from the generator to the motor which is thereby shut off. When handle 399 is moved to "forward" position, indicated by dot-and-dash line so titled, the motor wire 489 will be connected to the motor wire 490 and the generator wire 495 will be connected to the motor wire 497. Electric current may then flow in one direction through the motor armature and field via wires 496, 489, 490, 497 and 495 to cause running of motor 86 in a forward direction. When handle 399 is moved to "reverse" position, indicated by the dot-and-dash line in the drawing bearing that title, the motor wire 489 will be connected to the motor wire 497 and generator wire 495 will be connected to motor wire 490 in reverse order for reversing the direction of rotation of the driving motor 86 and hence the direction of movement of the locomotive.

To control energization and deenergization of magnet valve device 404, the operator's handle 399 may be connected to one pole of a battery such as the battery 475 while one pole of the magnet valve device 404 is connected to ground. Two electrical contact elements 498, 499 are arranged for engagement by the handle 399. Contacts 498, 499 are connected electrically one with the other by means of a wire 500 which is in turn connected to the opposite pole of the magnet valve device 404. The contacts 498, 499 are so adapted and arranged that when handle 399 is in its "off" position, the circuit connected to the magnet valve device 404 will be broken and said device therefore deenergized. Movement of handle 399 to either "forward" or "reverse" position will complete the electrical circuit through said handle to the respective contact 498 or 499, and the magnet valve device 404 will therefore be energized.

As before mentioned, when magnet valve device 404 is deenergized, the pipe 470 connected to chamber 416 in the actuator device 382 is vented to atmosphere so that pressure of fluid in the respective chamber 415 will be effective to change the speed setting of the governor device 381. The magnet valve device 404 is deenergized when the operator's handle 399 is in "off" position, with the motor 86 disconnected from the generator 83, to allow the turbine 45 to be operated by handle 389 through its full speed range during test or warm-up free from influence of the low temperature interlock 401. The magnet valve device 404 is energized when handle 399 of the operator's controller 387 is in either "forward" or "reverse" position, i. e., when the motor 86 is operating to drive the locomotive to submit the actuator device 382 to the influence of the low temperature interlock 401 to assure operation of the turbine at a relatively high temperature before the speed of the turbine may be increased above idling speed.

A mechanical interlock arrangement is provided in the operator's controller device 387 which prevents handle 399 from being positioned when the handle 389 is in any position other than its "idle" position. The driving motor 86, therefore, cannot be started, stopped, or reversed by movement of handle 399 while the plant is delivering other than a certain minimum amount of power. Obviously, this is desirable, since otherwise serious damage to parts of the plant as well as danger to operating personnel might result.

The interlock arrangement may comprise an annular segment element 505 secured for rotary movement with handle 389. A somewhat similar annular segment element 506 is secured for rotary movement with handle 399. The outer arcuate edges of elements 505, 506 intersect and overlap, said elements being spaced apart. An upstanding rib 507 is attached to the outer edge of element 505, and a downwardly extending rib 508 shown in dotted outline is attached to the outer edge of element 506, as viewed in the drawing. Rib 507 is provided with a transverse groove 509 which is in registry with the rib 508 when handle 389 is in "idle" position. This allows rib 508 to be rotated through groove 509 by movement of handle 399 in either direction when handle 389 is in "idle" position. In "forward," "off," and "reverse" positions of handle 399, grooves 510, 511, 512 in the rib 508 respectively align with the rib 507 and allow it to be rotated by handle 389 out of "idle" position subsequent to positioning of handle 399. Once handle 389 is moved out of "idle" position, rib 507 will move into one of the grooves 510, 511, 512 dependent upon position of handle 399, and groove 509 in rib 507 will no longer register with rib 508 so that any attempt under these conditions to change position of handle 399 from one position to another brings the walls of any particular groove in rib 508 into engagement with rib 507 and thereby prevents turning movement of said handle 399. Once handle 389 is returned to "idle" position and groove 509 in rib 507 again aligns with rib 508, handle 399 is again free to be repositioned.

In the starting portion of the control apparatus for the plant, the fluid pressure actuator device 405 for adjusting position of the needle valve device 67 is similar to the actuator device 376. Device 405 is responsive to variations in pressure of fluid in a pipe 513 connected to chamber 416 therein to adjust position of needle valve 67a in device 67. As pressure of fluid in chamber 416 is increased from a minimum value of ten pounds to a maximum value of sixty pounds, for example, the actuator device 405 will respond to vary position, through lever 421 and stem 67d, of the needle valve 67a from a substantially closed position to a fully open position for accordingly varying the amount of fuel oil supplied from pipe 67b to the combustion chamber 58 from a minimum amount to a maximum amount. When pressure of fluid in pipe 513 is at its minimum value, ten pounds for example, the needle valve 67a will be disposed a slight distance away from its seat 67c to allow a certain quantity of fuel oil to flow to the combustion chamber to support a pilot flame for assuring combustion of coal supplied to said chamber during running of the plant after warm-up with the oil. Graduated increase in pressure of fluid in pipe 513 will cause graduated increase in amount of fuel oil supplied to the combustion chamber 58 for warm-up of the plant during starting thereof. During starting, the turbine shaft $x$ is rotated by a starting motor 800 operated by electrical energy from such as a battery 801 and controlled by a switch 802 while the fuel oil is burned in the combustion chamber for warm-up until the turbine develops sufficient power to be self-operating and is taken off the starting motor and operated on the fuel oil.

The pipe 513 is connected to the delivery chamber 204 of a self-lapping valve device 514 comprised in the operator's control valve device 406. The self-lapping valve device 514 is similar to the self-lapping valve device 201. The supply chamber 203 in device 514 is connected to a pipe 515 which is adapted to be supplied with fluid under pressure via delivery chamber 334 in magnet valve device 409 when energized. Magnet valve device 409 is similar to magnet valve device 191 and its supply chamber 333 is connected to a pipe 516 adapted to be supplied with fluid under pressure from a source independent from the compressors driven by the turbine 45; such a source as an auxiliary compressor 810, driven by a motor 811, feeding a reservoir 812 connected to pipe 516, which may furnish fluid under pressure before the plant is started. When magnet valve device 409 is deenergized, pipe 515 is open to the atmosphere via pipe 336.

The operator's control valve device 406 also comprises an operating portion for adjusting position of the stem 200 in the self-lapping valve device 514 for effecting the variations in pressure of fluid in pipe 513. The operating portion may be provided with a cam 517 adapted to be rotated about a fixed point 518 by an operator's handle 519. A casing may be provided secured to the self-lapping valve device 514 to carry the cam 517 and handle 519. Handle 519 may project outwardly through a suitable slot formed in the casing. Opposite ends of the slot may define the opposite extreme limits of travel for movement of the handle 519, and these limits may represent "minimum fuel," in which position it is shown in the drawing, and "maximum fuel," respectively. The cam 517 is so shaped that by moving the handle from "minimum fuel" position towards "maximum fuel" position the self-lapping valve device 514 is rendered responsive to effect an increase in pressure of fluid in pipe 513 to call for more fuel oil to be supplied from nozzle device 67 to the combustion chamber 58. Conversely, by subsequent movement of handle 519 back toward "minimum fuel" position, calls for a reduction in amount of fuel oil to the combustion chamber.

The pipe 513 is also connected to the diaphragm chamber 245 of a relay valve device 407, which is similar to the relay valve device 189.

The chamber 250 of device 407 is connected to the pipe 515, while the chamber 249 thereof is connected via a pipe 520, and branches thereof, to the chamber 66 of the by-pass valve device 55 and to the chamber 292 of the fluid pressure switch device 408, which is similar to the fluid pressure switch device 184 with the exception that in said device 408 the switch element 295 is normally closed when pressure of fluid in chamber 292 is at atmospheric pressure.

When pressure of fluid in pipe 515 is increased above its minimum value a certain amount by movement of handle 519 in the control valve device 406 out of "minimum fuel" position, during starting of the plant, the relay valve device 407 will respond to connect the pipe 520 to open the switch device 408 and move the piston slide valve 61 in by-pass valve device 55 to its second position, as previously defined, for by-passing any coal and/or air supplied to the pipe 54 back into the tank 8 via pipe 59.

When handle 519 is in "minimum fuel" position, i. e., when pressure of fluid in pipe 513 is at a minimum, the relay valve device 407 will connect pipe 520 to atmosphere via pipe 330.

The normally closed switch device 408 is interposed in a wire 521 connected between one pole of battery 300 and one pole of the stoker motor 25, the opposite pole of said motor being connected to the opposite pole of said battery by way of the wire 301 and starting switch 410.

When the switch 410 is closed, which will be the first thing to be done upon starting the plant, the terminals of battery 300 are connected to the wires 299, 301 and 521. With the switch device 408 normally closed, the motor 25 will start into operation for feeding coal from tank 20 into the pipe 24. Upon movement of handle 519 in the control valve device 406 out of "minimum fuel" position, for supplying fuel oil to the combustion chamber for warm-up, it will be seen that through relay valve device 407, the switch device 408 is caused to break the electrical circuit to stop motor 25, thus preventing any supply of coal to the feed line 27, while the by-pass valve device 55 connects pipe 54 to pipe 59 so that once the turbine is being warmed-up on fuel oil any coal and/or combustion air flowing in pipe 54 will be returned to tank 8.

As the turbine 45 reaches a certain temperature by supply of fuel oil in combustion chamber 58, such as 700° F., and speed, such as 3000 R. P. M., the starting motor turning the turbine may be shut down and the handle 519 in the control valve device 406 moved substantially to "maximum fuel" position to bring the turbine 45 up to idling speed, about 4300 R. P. M. for example.

During warm-up of the plant on fuel oil, the reservoir 94 will have become charged with fluid under pressure to pressurize the control supply line 115. The coal handling portion of the plant will therefore be operating according to dictates of the controls therefor, as previously described When it is desired to operate the plant or coal, the handle 519 may be backed off toward "minimum fuel" position for reducing pressure of fluid in pipe 513. When pressure of fuel in pipe 513 reaches a certain value, the relay valve device 407 will respond to cut off pipe 520 from pipe 515 and to connect said pipe 520 to atmosphere. The switch device 408 then returns to its normally closed position to start up the motor 25 for supplying coal to the pipe 24 in which conveying air will now be flowing, and the by-pass valve device 55 is then allowed to return to its first position to connect coal and conveying air flowing in pipe 54 to pipe 56 for supply to the combustion chamber 58. Coal thus supplied at this time to the combustion chamber may be burned along with a relatively great amount of fuel oil from nozzle 67 to assure proper combustion of said coal. The handle 519 in control valve device 406 may then be returned to "minimum fuel" position for cutting supply of fuel oil down to a quantity sufficient to support a pilot flame in the combustion chamber 58. Subsequent control of coal operation of the plant is then taken over by the operator's controller device 387 as previously described.

A normally closed switch 525 may then be opened to cut off supply of current to the magnet valve device 409 for deenergizing the same to prevent any unintentional supply of fuel oil, other than the pilot supply to the combustion chamber 58 by accidental movement of handle 519 in control valve device 406 during operation of the plant on coal.

Normally open cut-out cocks 550 are provided the control apparatus inserted at convenient stations in various control lines and pipes which are operable by positioning a handle 551 to a closed position for isolating sections of said apparatus pneumatically to facilitate removal or repair of devices therein without draining the entire control system of fluid under pressure.

*Summary*

From the foregoing, it will be seen that we have provided control apparatus for controlling operation of a coal burning gas turbo-electric power plant, including coal processing and handling equipment, adapted for use on railway locomotives.

We have provided means comprised in the control apparatus which will function automatically to assure an adequate supply of coal from the coal processing portion of the plant for supply to the combustion chamber at all times during operation of the plant.

We have further provided means comprised in the control apparatus which, as power output of the turbine is increased initially, will assure operation of the turbine in the plant at a constant idling speed until operating temperature of the turbine reaches a desired value which is sufficiently high to assure a high thermal efficiency of the turbine, whereupon, the speed of the turbine may be increased at substantially constant temperature to further increase the power developed by the turbine.

Having now described the invention, what we claim as new and desire to secure by Letters Patent, is:

1. Control apparatus for a variable speed gas turbine plant comprising a gas turbine, a combustion chamber for producing operating gas for said turbine, fuel supply means connected to and supplying fuel to said combustion chamber, and an electric generator operative by said turbine for producing electric power, said control apparatus comprising power control means operatively connected to said fuel supply means for varying fuel supply to said turbine according to power demand, excitation control means connected with said electric generator, speed control means operably connected to said turbine, to said power control means and to said excitation control means, and temperature responsive means responsive to operating temperature of said turbine and connected to said speed control means for limiting speed of said turbine until operating temperature of said turbine reaches a predetermined value for best thermal efficiency.

2. Control apparatus for a variable speed gas turbine plant comprising a gas turbine, a combustion chamber for producing operating gas for said turbine, fuel supply means connected to and supplying fuel to said combustion chamber, an electric generator connected to and being operative by said turbine for producing electric power, said control apparatus comprising power control means operatively connected to said fuel supply means for varying fuel supply to said turbine according to power demand, excitation control means connected with said electric generator, speed control means operably connected to said turbine, to said power control means and to said excitation control means, temperature responsive means responsive to operating temperature of said turbine and connected to said speed control means and limiting speed of said turbine until operating temperature of said turbine reaches a predetermined value at which best thermal efficiency is obtained, and second temperature responsive means responsive to operating temperature of said turbine and connected with said power control means and with said fuel supply means for adjusting fuel supply to said combustion chamber in accordance with said operating temperature to prevent said temperature from becoming excessive.

3. A system for regulating the output of a variable speed gas turbo-electric plant to an electric driving motor, comprising, in combination, an electric generator operable to generate electric power, switch means operable to connect and disconnect electrically said generator to and from said driving motor, a gas turbine having an inlet and driving said generator, an air compressor operated by said turbine and supplying compressed air to said inlet, a combustion chamber connected to said inlet and producing high temperature gas for mixture with said compressed air, fuel supply means connected to and supplying fuel to said combustion chamber, speed control means operably connected to said turbine and operatively connected to said fuel supply means, and temperature responsive means responsive to temperature in said inlet, said temperature responsive means being connected with said speed responsive means and with said fuel supply means and limiting speed of said turbine until a predetermined temperature in said inlet is reached, and means connected with said switch means and with said temperature responsive means and rendering said temperature responsive means ineffective when said driving motor is disconnected from said generator.

4. A system for regulating power output from a gas turbo-electric power plant comprising, in combination, an electric generator, a gas turbine operatively connected to said generator, fuel supply control means connected with said turbine, field excitation control means connected with said generator, speed control means normally connected with said fuel supply control means and with said field excitation control means, power control means connected with said speed control means and with said fuel supply control means for controlling power output of said plant from idling to full power, and means connected with said power control means and with said field excitation control means operable to disconnect said field excitation control means from said speed control means when said plant is idling.

5. Control apparatus for a gas turbine operated electric generator comprising output regulating means for said generator, a fuel burner having a combustion chamber open to said turbine, fuel supply regulating means for said chamber, first and second means for controlling said output and fuel supply regulating means respectively, mechanism for operating said first and second means in unison, an adjustable speed governor for controlling said mechanism, operator's control means for controlling adjustment of said speed governor and having an idling position, interlock means controlled by said operator's control means operable in and out of said running position to render said first means ineffective and effective, respectively, to control said output regulating means, temperature responsive means controlled by temperature of gas delivered to said turbine, and means controlled by said temperature responsive means for rendering said speed governor non-responsive to operation of said operator's control means below a chosen temperature of gas delivered to said turbine.

6. Control apparatus for a gas turbine operated electric generator comprising output regulating means for said generator, a fuel burner having a combustion chamber open to said turbine, fuel supply regulating means for said chamber, first and second means for controlling said output and fuel supply regulating means, respectively, mechanism for operating said first and second means in unison, an adjustable speed governor for controlling said mechanism, operator's control means for controlling adjustment of said speed governor and having an idling position, interlock means controlled by said operator's control means operable in and out of said running position to render said first means ineffective and effective, respectively, to control said output regulating means, temperature responsive means controlled by temperature of gas delivered to said turbine, and means controlled by said temperature responsive means for rendering said speed governor non-responsive to operation of said operator's control means below a chosen temperature of gas delivered to said turbine, an electric motor, a reversing switch for connecting said generator to said motor and having forward, reverse and power off positions, and interlock means controlled by said reversing switch for rendering the means controlled by said temperature responsive means effective to control said speed governor only in the off position of said reversing switch.

7. In combination with a gas turbine, an electric generator operably connected to said turbine, output regulating means for said generator, governor means operatively connected to said output regulating means responsive to speed of operation of said turbine, operator's control means for controlling the speed setting of said governor means, and thermostat means sensitive to operating temperature of said turbine to prevent increase in speed setting of said governor means until a predetermined turbine operating temperature is reached.

8. The combination as set forth in claim 7, including means operable by said operator's control means to render said output regulating means non-responsive to said governor means.

HARRY C. MAY.
ELLIS E. HEWITT.

REFERENCES CITED

The following references are of record in the file of this patent:

UNITED STATES PATENTS

| Number | Name | Date |
|---|---|---|
| 1,978,837 | Forsling | Oct. 30, 1934 |
| 2,193,114 | Seippel | Mar. 12, 1940 |
| 2,263,705 | Seippel | Nov. 25, 1941 |
| 2,336,052 | Anderson et al. | Dec. 7, 1943 |
| 2,336,232 | Doran | Dec. 7, 1943 |
| 2,339,185 | Nettel | Jan. 11, 1944 |
| 2,353,929 | Ray | July 18, 1944 |
| 2,424,121 | Schlapfer | July 15, 1947 |
| 2,432,177 | Sedille | Dec. 9, 1947 |
| 2,433,628 | Schlapfer | Dec. 30, 1947 |
| 2,472,924 | Schwendner | June 14, 1949 |
| 2,482,560 | Schwendner | Sept. 20, 1949 |
| 2,510,753 | Multhaup | June 6, 1950 |